United States Patent
Nishiyama et al.

(10) Patent No.: US 12,276,973 B2
(45) Date of Patent: Apr. 15, 2025

(54) CONTROL SYSTEM

(71) Applicant: OMRON CORPORATION, Kyoto (JP)

(72) Inventors: Yoshihide Nishiyama, Kyoto (JP); Yasuhiro Nishimura, Kyoto (JP); Shigeyuki Eguchi, Kyoto (JP); Katsuhiko Azuma, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 393 days.

(21) Appl. No.: 17/623,374

(22) PCT Filed: Jul. 2, 2020

(86) PCT No.: PCT/JP2020/025985
§ 371 (c)(1),
(2) Date: Dec. 28, 2021

(87) PCT Pub. No.: WO2021/002421
PCT Pub. Date: Jan. 7, 2021

(65) Prior Publication Data
US 2022/0413474 A1     Dec. 29, 2022

(30) Foreign Application Priority Data
Jul. 4, 2019   (JP) .................................. 2019-125025

(51) Int. Cl.
*G05B 19/418*     (2006.01)

(52) U.S. Cl.
CPC ................. *G05B 19/41865* (2013.01); *G05B 2219/31001* (2013.01)

(58) Field of Classification Search
CPC .... G05B 19/41865; G05B 2219/31001; G05B 2219/13063; G05B 2219/13141;
(Continued)

(56) References Cited

U.S. PATENT DOCUMENTS

2002/0103592 A1   8/2002  Gross et al.
2014/0298070 A1*  10/2014 Kim ...................... H04J 3/0697
                                                          713/375
(Continued)

FOREIGN PATENT DOCUMENTS

CN       108693821 A      10/2018
CN       109716247 A       5/2019
(Continued)

OTHER PUBLICATIONS

Office Action issued Apr. 25, 2023 in Japanese Application No. 2021-529179.
(Continued)

*Primary Examiner* — Charles R Kasenge
(74) *Attorney, Agent, or Firm* — Sughrue Mion, PLLC

(57) ABSTRACT

A control system for factory automation includes a first unit and a second unit each including a timer, a data line over which data containing a timer value indicated by the timer is exchanged between the first unit and the second unit, a signal line that electrically connects the first unit and the second unit, and an adjustment module connected to the signal line and the data line. The adjustment module acquires, when receiving a trigger signal over the signal line, the timer value over the data line and matches the timer of the second unit with the timer of the first unit based on the timer value acquired.

10 Claims, 15 Drawing Sheets

(58) Field of Classification Search
CPC ....... G05B 19/052; G05B 19/054; G06F 1/12; G06F 1/14; G06F 15/17325; Y02P 90/02
See application file for complete search history.

(56) References Cited

U.S. PATENT DOCUMENTS

| | | | |
|---|---|---|---|
| 2015/0046741 A1* | 2/2015 | Yen | G04G 7/00 713/400 |
| 2016/0095078 A1* | 3/2016 | Yamada | H04W 56/0035 370/242 |
| 2018/0109655 A1* | 4/2018 | Ichimura | G05B 19/4185 |
| 2018/0284710 A1 | 10/2018 | Abe et al. | |
| 2019/0056705 A1* | 2/2019 | Ukena | G05B 19/042 |
| 2019/0163655 A1* | 5/2019 | Yamaguchi | G06F 11/0757 |
| 2019/0229885 A1 | 7/2019 | Fukuda et al. | |
| 2020/0079595 A1* | 3/2020 | Pauditz | B65G 35/06 |
| 2020/0099626 A1 | 3/2020 | Yoneda et al. | |
| 2020/0244594 A1 | 7/2020 | Yoneda | |
| 2021/0135836 A1 | 5/2021 | Yoneda | |

FOREIGN PATENT DOCUMENTS

| | | |
|---|---|---|
| JP | 2009-20547 A | 1/2009 |
| JP | 2014-146070 A | 8/2014 |
| JP | 2014-146877 A | 8/2014 |
| JP | 2015-118505 A | 6/2015 |
| JP | 2018-64219 A | 4/2018 |
| JP | 2019-62288 A | 4/2019 |
| JP | 2019-96243 A | 6/2019 |
| KR | 10-1970715 B1 | 4/2019 |
| WO | 2015/008389 A1 | 1/2015 |
| WO | 2015/128981 A1 | 9/2015 |
| WO | 2018/146891 A1 | 8/2018 |
| WO | 2019/058861 A1 | 3/2019 |
| WO | 2019/065015 A1 | 4/2019 |
| WO | 2020/054477 A1 | 3/2020 |

OTHER PUBLICATIONS

Extended European Search Report dated Jul. 7, 2023 in Application No. 20834296.4.
Chinese Office Action dated Mar. 4, 2024 in Application No. 202080046725.8.
Decision to Grant a Patent dated Apr. 2, 2024 in Japanese Application No. 2021-529179.
International Search Report for PCT/JP2020/025985 dated Sep. 15, 2020.
Written Opinion for PCT/JP2020/025985 dated Sep. 15, 2020.
Chinese Office Action dated Jul. 19, 2024 in Application No. 202080046725.8.

* cited by examiner

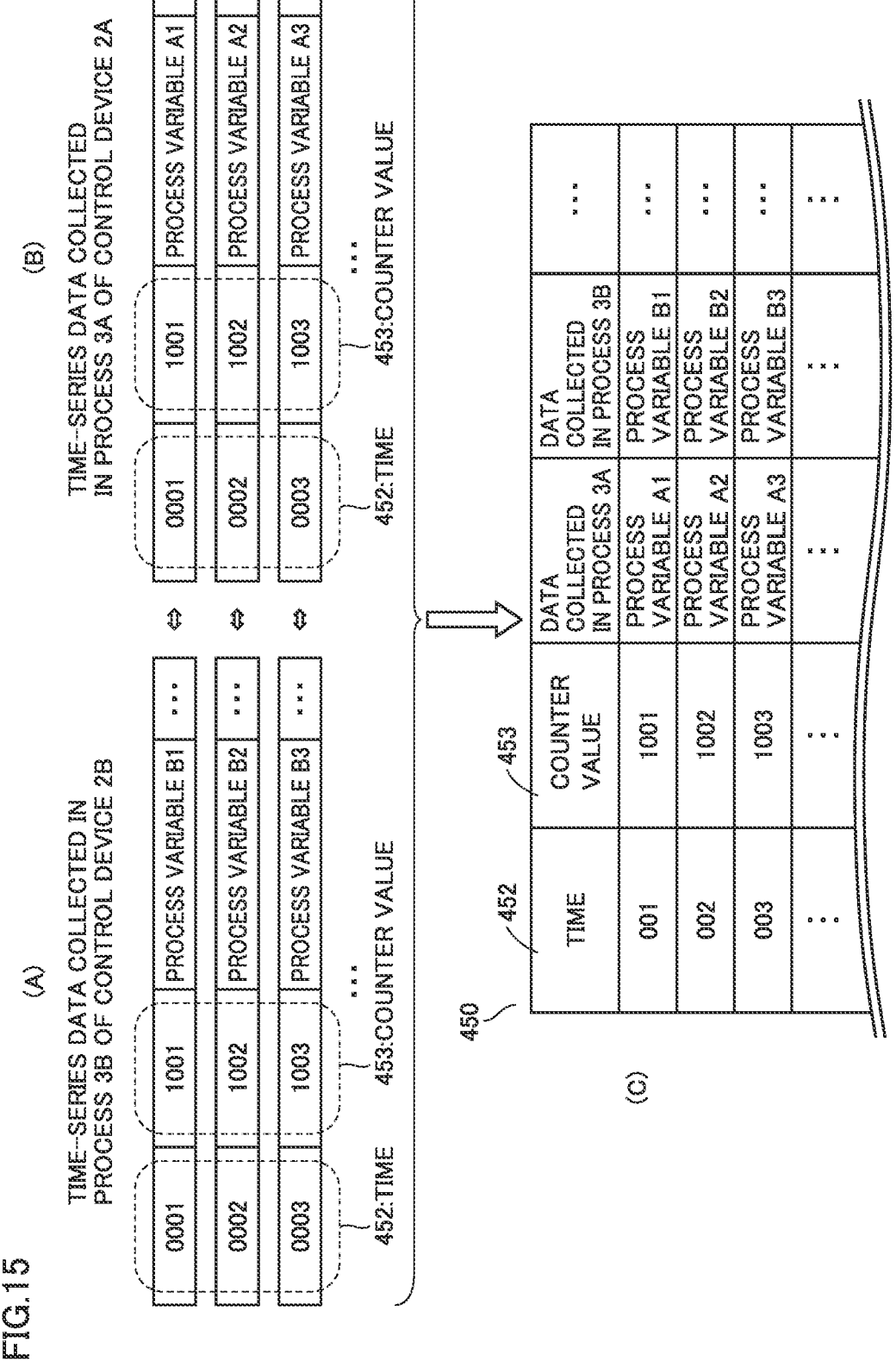

CONTROL SYSTEM

CROSS REFERENCE TO RELATED APPLICATIONS

This application is a National Stage of International Application No. PCT/JP2020/025985 filed Jul. 2, 2020, claiming priority based on Japanese Patent Application No. 2019-125025 filed Jul. 4, 2019, the entire contents of each of which being herein incorporated by reference in their entireties.

TECHNICAL FIELD

The present disclosure relates to a control system for factory automation (FA).

BACKGROUND ART

In various production sites, FA technology using a control device such as a programmable logic controller (PLC) is widely used. Such a control device transmits and receives data to and from one or more machines over a bus or a network.

With an increase in functionality of such a control system, a configuration where a plurality of control devices that perform mutually independent control processing are connected over a network is about to reach practical levels. For example, Japanese Patent Laying-Open No. 2015-118505 (PTL 1) discloses a control system in which a plurality of control devices are connected over a controller-level network. To each of the plurality of control devices, a plurality of input/output devices are connected over a device-level network. Each control device transmits input values acquired from the plurality of input/output devices to a server over the controller-level network.

Further, as disclosed in Japanese Patent Laying-Open No. 2014-146877 (PTL 2), a first communication device and a second communication device are connected via a PCIe cable IF. For the calculation of the amount of correction for time synchronization, a time request packet is transmitted from the first communication device to the second communication device, and a time response packet is transmitted from the second communication device to the first communication device.

CITATION LIST

Patent Literature

PTL 1: Japanese Patent Laying-Open No. 2015-118505
PTL 2: Japanese Patent Laying-Open No. 2014-146877

SUMMARY OF INVENTION

Technical Problem

As disclosed in PTL 1, the plurality of control devices performs the mutually independent control processing, so that it is not possible to synchronize a timing for collecting data (input data) collected or generated by a machine or a timing for transmitting, to the target machine, data (output data) such as an instruction to be issued to the machine between one control device and the other control device.

Further, in order to allow a machine connected to the one control device and a machine connected to the other control device to operate in a coordinated manner, it is necessary for the control devices to exchange information on their respective machines, but the timings for collecting the input data or the timings for outputting the output data cannot be synchronized with each other, so that it is difficult to synchronize control timings between the plurality of machines.

As disclosed in PTL 2, in order to synchronize such timings, a means for calculating the amount of correction for time synchronization is provided, but it is necessary to exchange the time request packet and the time response packet as a procedure of time synchronization. This makes the synchronization procedure complicated and requires much time for time synchronization processing including packet communication time and correction.

It is therefore an object of the present disclosure to provide a configuration that simplifies processing for time synchronization between units and reduces time required for the processing.

Solution to Problem

A control system for factory automation according to an example of the present disclosure includes a first unit and a second unit each including a timer, a data line over which data containing a timer value indicated by the timer is exchanged between the first unit and the second unit, a signal line configured to electrically connect the first unit and the second unit, and an adjustment module connected to the signal line and the data line, in which the adjustment module acquires, when receiving a trigger signal over the signal line, the timer value over the data line and matches the timer of the second unit with the timer of the first unit based on the timer value thus acquired.

According to this disclosure, it is possible to make an adjustment for time synchronization of matching the timers between the units in response to the trigger signal. Further, the adjustment module acquires the timer value transmitted over the data line between the units when receiving the trigger signal and matches the timer of the second unit with the timer of the first unit based on the timer value thus acquired.

This allows the timing for matching the timers to be easily determined by the trigger signal. Further, the adjustment module can match the timers using the timer value transmitted over the data line. This eliminates the need for a communication session of request/response of the timer value between the units for time synchronization of matching the timers, thereby allowing a reduction in the time required for matching the timers.

According to the above-described disclosure, one of the first unit and the second unit transmits the trigger signal to the signal line.

According to this disclosure, the transmission source of the trigger signal may be one of the first unit and the second unit. Therefore, one of the first unit and the second unit can determine when to perform correction processing.

According to the above-described disclosure, the control system further includes a unit configured to transmit the trigger signal on the signal line, the unit being different from the first unit and the second unit.

According to this disclosure, the unit different from the first unit and the second unit can transmit the trigger signal.

According to the above-described disclosure, the adjustment module is provided in one of the first unit and the second unit.

According to this disclosure, it is possible to cause one of the first unit and the second unit to perform the time synchronization of matching the timers.

According to the above-described disclosure, the control system further includes a unit including the adjustment module, the unit being different from the first unit and the second unit.

According to this disclosure, it is possible to cause the unit different from the first unit and the second unit to perform the time synchronization of matching the timers. This prevents a load of the processing from being imposed on the first unit and the second unit.

According to the above-described disclosure, the adjustment module acquires, when receiving the trigger signal over the signal line, a difference between the timer value of the timer of the first unit and the timer value of the timer of the second unit using the timer value acquired over the data line, and adjusts the timer value of the timer of the second unit using an adjustment value based on the difference thus acquired to match the timer of the second unit with the timer of the first unit.

According to this disclosure, it is possible to determine the adjustment value for use in the time synchronization of matching the timers based on magnitude of a synchronization mismatch corresponding to the difference between the timer value of the timer of the first unit and the timer value of the timer of the second unit. For example, the larger the synchronization mismatch, the larger the adjustment value can be made.

According to the above-described disclosure, the adjustment module determines the adjustment value from a tendency of variation in the magnitude of the difference detected for each reception of the trigger signal.

According to this disclosure, the adjustment value can be determined based on the tendency of variation in the magnitude of the synchronization mismatch indicated by the difference. For example, when the synchronization mismatch is on the increase, the adjustment value can be made larger.

According to the above-described disclosure, the control system further includes a plurality of control devices connected to a first network, each of the plurality of control devices includes the first unit and the second unit, and the plurality of control devices are synchronized with each other using a common time received over the first network and used for synchronization between the timers.

According to this disclosure, the times can be synchronized among the control devices including the first unit and the second unit, and in each control device, the units can be synchronized using the timers that synchronize to the times. This allows each control device and each unit provided in the control device to be synchronized with each other.

According to the above-described disclosure, the control system further includes one or more machines connected to each of the plurality of control devices over a second network lower in level than the first network, and synchronous timers synchronized with each other among the plurality of control devices, and the control device and the one or more machines connected to the control device over the second network are synchronized with each other using timer values of the synchronous timers.

This allows each control device, each unit provided in the control device, and each machine connected to the control device to be synchronized with each other.

Advantageous Effects of Invention

According to the present disclosure, processing for time synchronization between units is simplified, and time required for the processing is reduced.

BRIEF DESCRIPTION OF DRAWINGS

FIG. 15 is a diagram schematically illustrating frames of time-series data created by control device 2 according to the present embodiment.

DESCRIPTION OF EMBODIMENTS

Figure 1:
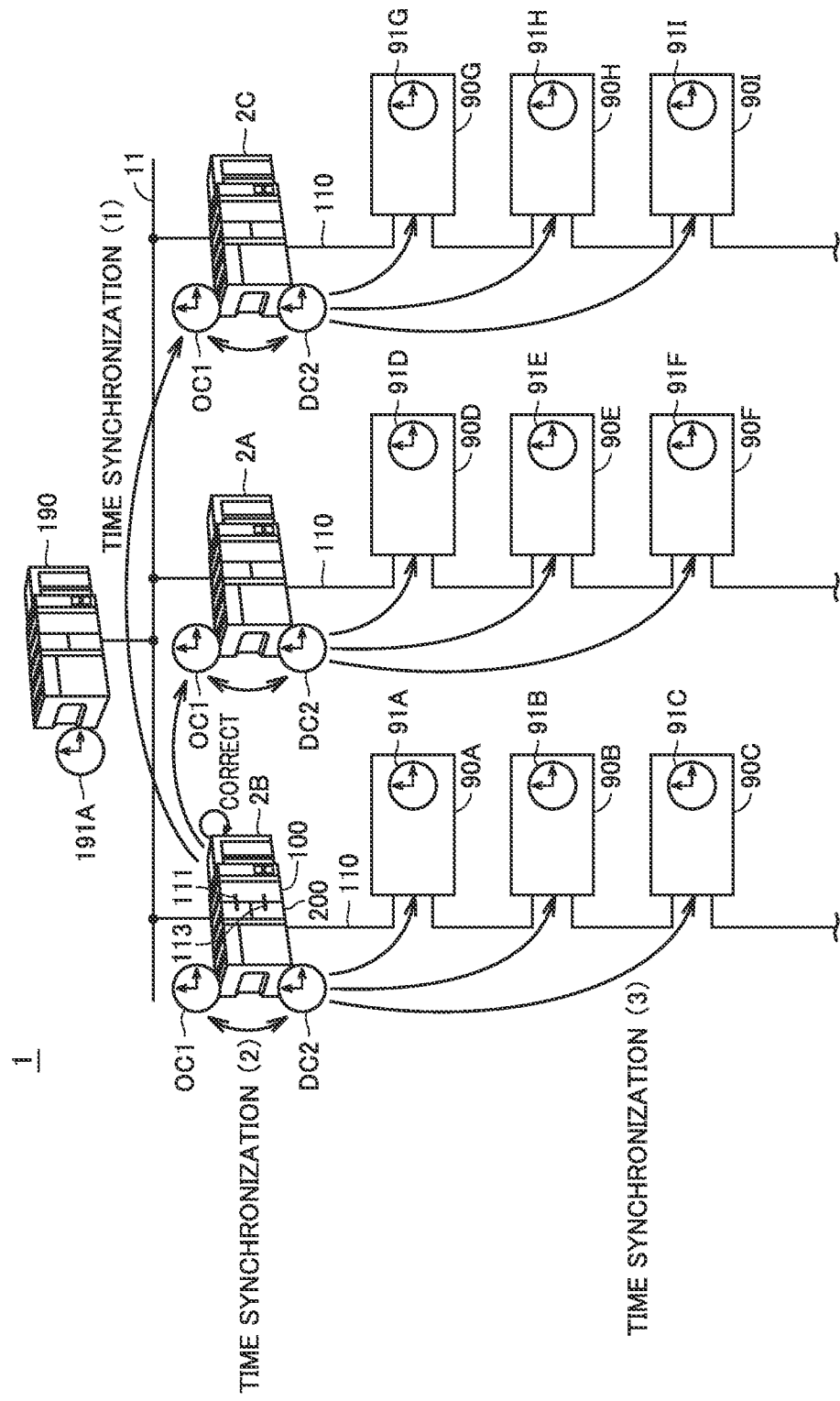
FIG. 1 is a diagram schematically illustrating an example of a case where a control system 1 according to the present embodiment is applied.

Embodiments of the present invention will be described in detail with reference to the drawings. Note that the same or corresponding parts in the drawings are denoted by the same reference numerals, and no redundant description will be given of such parts.

A. APPLICATION EXAMPLE

Referring to FIG. 1, an example of a case to which the present invention is applied will be described. FIG. 1 is a diagram schematically illustrating an example of a case where a control system 1 according to the present embodiment is applied. Control system 1 according to the present embodiment is a control system for factory automation, and includes a plurality of control devices 2A, 2B, 2C. Each control device controls any control target (for example, a manufacturing device or facility) including a field machine 90 (90A, 90B, 90C, 90D, 90E, 90F, 90I). The control devices have the same configuration, so that the description will be given with attention given to control device 2A.

In control system 1, each control device 2A includes a CPU unit 100 and a function unit 200 each including a timer, a data bus 111 over which data is exchanged between CPU unit 100 and function unit 200, and a signal line 113 electrically connecting CPU unit 100 and function unit 200. Time synchronization is performed using a timer value indicated by a counter OC1 of function unit 200 and a timer value indicated by a counter DC2 of CPU unit 100.

Specifically, for example, at startup, function unit 200 acquires absolute time from a master clock 191A and sets counter value OC1 at a value synchronized with the absolute time thus acquired. The value of counter value OC1 is transmitted to CPU unit 100 over data bus 111, and CPU unit 100 sets counter DC2 at a timer value that is the value of counter value OC1. Subsequently, CPU unit 100 periodically updates (increments or decrements) the value of counter DC2 using the output of an internal hardware circuit.

After the start-up, function unit 200 periodically updates the value of counter OC1 based on the absolute time acquired from master clock 191A. Function unit 200 periodically transmits the timer value that is the value of counter OC1 over data bus 111.

When a trigger signal is issued over signal line 113, correction processing for time synchronization is performed. Specifically, when receiving a time synchronization signal over signal line 113, CPU unit 100 latches (receives) the timer value indicated by counter OC1 transmitted over data bus 111, and acquires (latches) the timer value indicated by counter DC2 of CPU unit 100. CPU unit 100 matches the timer (counter DC2) of CPU unit 100 with the timer (counter OC1) of function unit 200 based on the timer values thus acquired. That is, CPU unit 100 calculates a difference between the acquired timer values, that is, a time synchronization mismatch, and corrects the value of counter DC2 to reduce the synchronization mismatch thus calculated. According to the present embodiment, the correction of the timer value or the counter value is a concept including an adjustment to a timer value to reduce the time synchronization mismatch.

This allows, even in the event of the synchronization mismatch due to, for example, an error in a hardware circuit provided in function unit 200 or CPU unit 100, the value of counter DC2 to be time-synchronized with the value of counter OC1, that is, master clock 191A.

Further, in each control device 2, the timer value of counter DC2 is referred to for scheduling of a control program for controlling various devices such as field machine 90 and an input/output program for exchanging data with field machine 90 over a network 110. Therefore, in each control device 2, such scheduling can be performed in synchronization with the timer value of counter DC2 time-synchronized with master clock 191A.

In each control device 2, the correction processing for time synchronization between the units can be performed in response to the trigger signal. The time synchronization signal serving as the trigger signal is, for example, periodically transmitted to allow the correction processing of correcting the value of counter DC2 to eliminate (or reduce) the synchronization mismatch to be periodically performed.

As described above, control devices 2A, 2B, and 2C each include counter OC1 and counter DC2 that are time-synchronized (corresponding to time synchronization (2) in FIG. 1).

Since each counter OC1 is time-synchronized with common timer 191A, the plurality of control devices 2A, 2B, and 2C can be time-synchronized with each other (corresponding to time synchronization (1) in FIG. 1). Further, counter DC2 provided in each of control devices 2A, 2B, and 2C is time-synchronized with timers 91A, 91B, 91C, 91D, 91E, 91F, 91G, 91H, 91I (hereinafter, collectively referred to as timers 91A to 91I) provided in one or more field machines 90 connected over network 110. As a result, control devices 2A, 2B, and 2C and field machines 90A to 90I are time-synchronized with each other (corresponding to time synchronization (3) in FIG. 1). This allows all the devices and machines in control system 1 to be synchronized with the time of master clock 191A.

A description will be given below of a more specific application example of the present embodiment.

The following description will be given as a specific example and focus on a programmable logic controller (PLC) as a typical example of the "control device", but the technical idea disclosed herein is not limited to the name of the PLC and is applicable to any control device. Further, the entire system including the PLC (control device) is hereinafter also referred to as a "control system".

B. Overall Configuration of Control System

Figure 2:
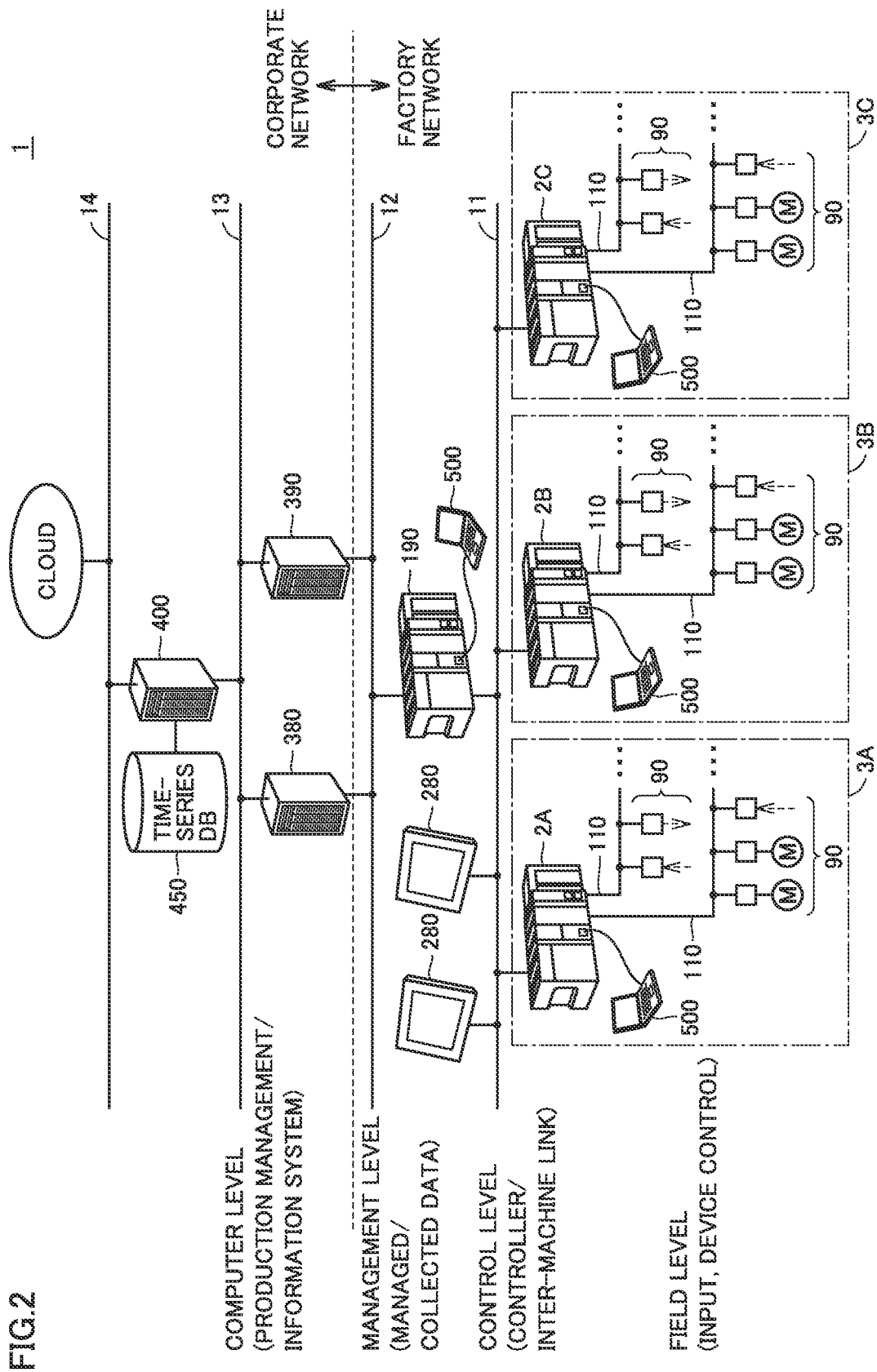
FIG. 2 is a diagram schematically illustrating an example of an overall configuration of control system 1 according to the present embodiment.

First, an overall configuration of a control system applicable to factory automation (FA) according to the present embodiment will be described. FIG. 2 is a diagram schematically illustrating an example of the overall configuration of control system 1 according to the present embodiment.

Referring to FIG. 2, in control system 1, a plurality of levels of networks are connected to each other, and a different function is assigned to each of the levels of networks. Specifically, four levels of networks 11 to 14 are provided, for example, but it is not limited to such a configuration.

Network 11 is a control-level network. The plurality of control devices 2A, 2B, and 2C (hereinafter, may be collectively referred to as "control device 2"), a device/line management device 190, and a display device 280 providing a supervisory control and data acquisition (SCADA) function are connected to network 11, and a data link that allows exchange of data between the devices is established over network 11. Device/line management device 190 and display device 280 each correspond to a device that is connected to the network and manages a production line. Network 11 is primarily responsible for transmission of information on the control system.

Field machines 90 of various types such as a sensor and an actuator are connected to control device 2. Such field machines 90 may be directly connected to control device 2 via an input/output unit attached to control device 2, or alternatively, may be connected to control device 2 over network 110. In the configuration example illustrated in FIG. 2, control device 2 is connected to one or more networks 110. One or more field machines 90 are connected to each network 110. One or more field machines 90 each include an actuator that applies some physical action to a manufacturing device, a production line, or the like (hereinafter, collectively referred to as a "field"), an input/output device that exchanges information with the field, and the like. Therefore, in addition to four levels of networks 11 to 14, field-level network 110 is further added to control system 1 illustrated in FIG. 2.

Data exchanged between control device 2 and field machine 90 over network 110 is updated at short intervals of several hundred microsecond order to several ten millisecond order. Note that such processing of updating exchanged data is also referred to as input/output refresh processing.

Network 12 is provided as a management-level network. Device/line management device 190 that manages devices and lines, and manufacturing management devices 380 and 390 that manage a manufacturing plan and the like are connected to network 12. Device/line management device 190 and manufacturing management devices 380 and 390 exchange management information such as the manufacturing plan and exchange information on the devices or lines over network 12.

Network 13 is provided as a computer-level network. Manufacturing management devices 380 and 390 and a manufacturing execution system (EMS) 400 that manages a time-series database (DB) 450 are connected to network 13. Manufacturing management devices 380 and 390, and manufacturing execution system 400 exchange production management data and information system data over network 13.

Manufacturing execution system 400 stores a process variable that is a value collected over network 13 and input from field machine 90 in time-series DB 450 as time-series data in chronological order.

Specifically, according to the present embodiment, control device 2 is capable of creating a frame containing a designated process variable. Control device 2 transfers the frame thus created to manufacturing execution system 400 over networks 11, 12, and 13. Manufacturing execution system 400 stores the frame containing the process variable received from control device 2 in time-series DB 450 in chronological order.

According to the present embodiment, the data stored in time-series DB 450 is also referred to as "time-series data". According to the present embodiment, the "time-series data" corresponds to a set of values obtained as a result of continuous (or alternatively, discontinuous, at regular intervals,) observation of a temporal change in data (process variable) for any desired target.

Herein, the "process variable" is a concept serving as a general term of values (real values) available for control operation in control device 2 and may typically include a value acquired from the control target and input for the control operation (such as a measurement value acquired from the field), an output value for the control target determined by the control operation based on the input value thus acquired (such as a manipulated variable given to the field), a calculated value calculated through the control operation (any variable value), and the like. That is, the "process variable" includes any value that can be stored as data in control device 2 or can be output as data from control device 2 to the outside.

Examples of network 14 include an external network such as the Internet. Manufacturing execution system 400 and an external device on a cloud are connected to network 14. Manufacturing execution system 400 exchanges data with a device on the cloud to transfer the data of time-series DB 450 to the device on the cloud.

A support device 500 may be connected to control device 2. Support device 500 is a device that supports preparation necessary for control device 2 to control the control target.

Control devices 2A, 2B, and 2C connected to network 11 of control system 1 are provided for different processes 3A, 3B, and 3C, respectively. Specifically, processes 3A, 3B, and 3C may be, but not limited to, a process of assembling workpieces into a product (work), a process of painting the assembled product, a process of inspecting the painted product, respectively.

In control system 1 illustrated in FIG. 2, network 12, and network 11 and network 110 lower in level than network 12 are also referred to as a "factory network" and provides control-system communications for exchanging data used in actual control of the machines (hereinafter, may be collectively referred to as "control-system data"). On the other hand, network 13 and network 14 higher in level are also referred to as a "corporate network" and provide information-system communications for exchanging data used in supervising, management, and control of a production activity and the like in a production line/factory (hereinafter, may be collectively referred to as "information-system data").

For networks 11 to 14 and network 110, protocols and frameworks adapted to such differences in required characteristics are used. A protocol used on network 11 and network 12 belonging to the factory network may be EtherNet/IP (registered trademark), which is an industrial open network obtained by implementing a control protocol on standard Ethernet (registered trademark). Further, a protocol used on network 110 may be EtherCAT (registered trademark), which is an example of a machine control network. Note that the protocol (first protocol) used on network 11 and the protocol (second protocol) used on network 110 may be the same or different. The application of such network technology suitable for machine control makes it possible to provide real-time constraints under which the deadline for transmission between devices is guaranteed.

On the other hand, a protocol used on networks 13 and 14 belonging to the corporate network may be the standard Ethernet or the like so as to adapt to various type of connection destinations. The application of the standard Ethernet makes it possible to eliminate restrictions on the amount of transmission data and the like.

C. Time Synchronization in Control System 1

Over the factory network illustrated in FIG. 1, each of the plurality of control devices 2A, 2B, and 2C connected to network 11 transmits and receives data to and from one or more field machines 90 connected over network 110. Specifically, control device 2 performs processing of collecting data (input data) collected or generated by field machine 90 (input processing), processing of generating data (output data) such as an instruction to be issued to field machine 90 (calculation processing), processing of transmitting the output data thus generated to target field machine 90 (output processing), and the like.

Further, network 110 must guarantee the arrival time of data. Therefore, control device 2 includes timers that provide a timing for data transmission and are time-synchronized with each other among entities (that is, one or more field machines 90) to or from which data is transmitted or received.

However, when the plurality of control devices 2 are not time-synchronized, field machine 90 connected to one control device 2 and field machine 90 connected to another control device 2 cannot be time-synchronized, for example. This may prevent the timings for the input/output refresh processing from matching with each other, so that it is difficult for the plurality of field machines 90 connected to different control devices 2 to operate in a coordinated manner.

Further, in control system 1 according to the present embodiment, the timers of the plurality of control devices 2 are time-synchronized with each other. This makes it possible to bring the plurality of field machines 90 connected to different control devices 2 under coordinated control between different processes.

A description will be given below of a time synchronization function provided by control system 1 according to the present embodiment.

C1. Example of Network Configuration

Figure 3:
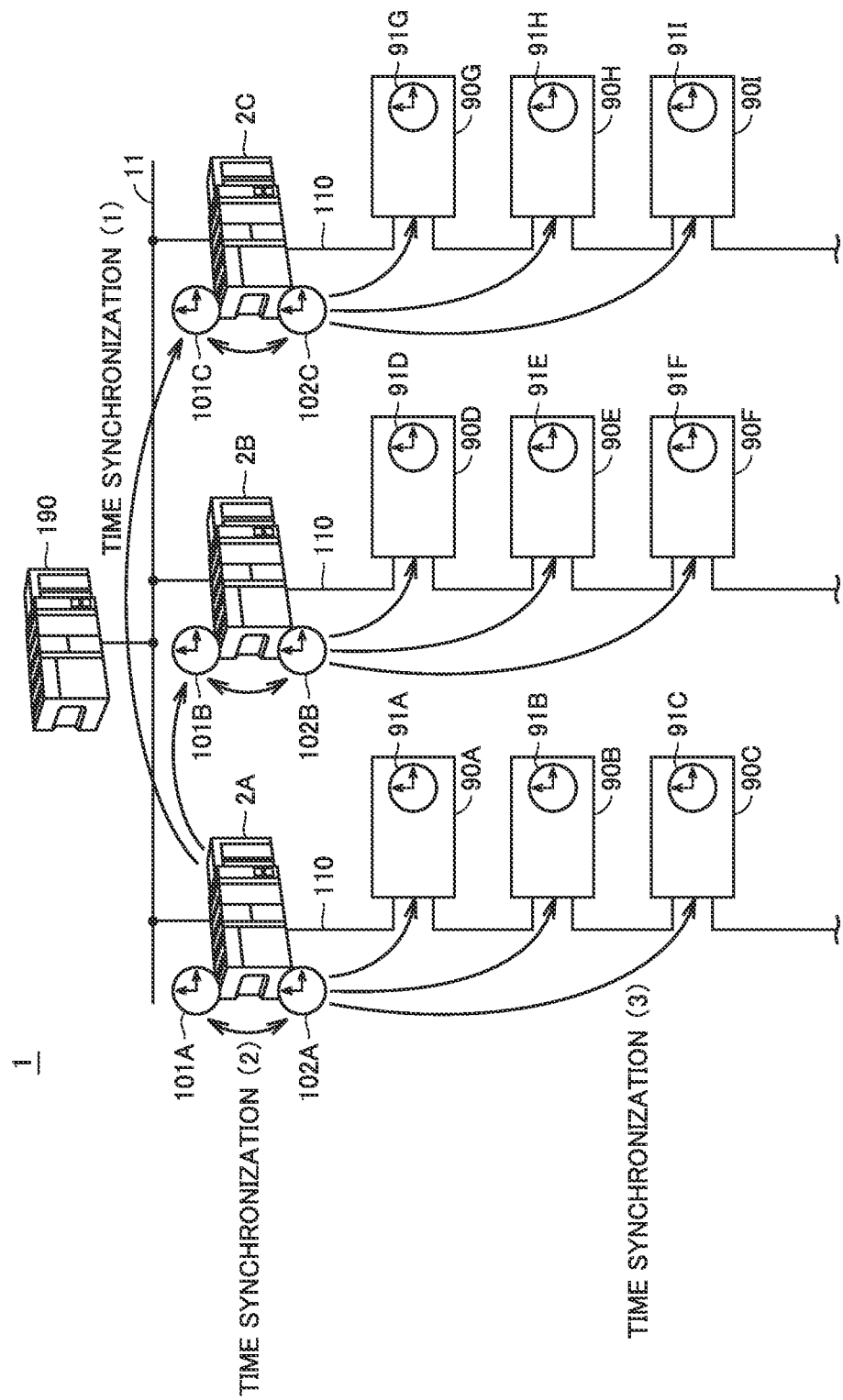
FIG. 3 is a diagram schematically illustrating an example of a network configuration of control system 1 according to the present embodiment.

Next, an example of the network configuration of control system 1 according to the present embodiment will be described. FIG. 3 is a diagram schematically illustrating an example of the network configuration of control system 1 according to the present embodiment.

Control system 1 illustrated in FIG. 3 includes a plurality of control devices 2A, 2B, and 2C and a plurality of field machines 90A to 90I. As an example, a network that allows at least some control devices to be daisy-chained is applied to control system 1. Control devices 2A, 2B, and 2C each serve as a master responsible for managing data transmission over a corresponding network 110. Field machines 90A to 90I each serve as a slave that transmits data in accordance with an instruction from a corresponding master.

Control devices 2A, 2B, and 2C are connected to control-level network 11 (upper-level network). For example, device/line management device 190 is connected to network 11.

Field machines 90A, 90B, 90C are daisy-chained in series over network 110 connected to control device 2A, field machines 90D, 90E, 90F are daisy-chained in series over network 110 connected to control device 2B, and field machines 90G, 90H, and 90I are daisy-chained in series over network 110 connected to control device 2C.

In network 110, control device 2 and one or more field machines 90 can be regarded as communication devices capable of transmitting data. In the example illustrated in FIG. 3, control device 2 and one or more field machines 90 are each capable of transmitting, upon reception of data transmitted over the network from any adjacent communication device connected to the network, the data to another adjacent communication device connected to the network as needed.

In control system 1 according to the present embodiment, transmission/reception timings are synchronized among the plurality of communication devices connected to network 110, that is, control device 2 and one or more field machines 90 (corresponding to time synchronization (3) in FIG. 3). Specifically, control device 2 and one or more field machines 90 each include a timer time-synchronized with each other (alternatively, a counter that is incremented or decremented in synchronization with each other). Control device 2 and one or more field machines 90 each determine a data transmission or reception timing in accordance with the time-synchronized timers or counters.

Note that, according to the present embodiment, the "timing" represents a timing, a period of time, or a time when some event occurs. Further, the "time synchronization" indicates synchronization among respective timers, time data, or the like included in devices.

In the example illustrated in FIG. 3, timers 101A, 101B, and 101C each correspond to counter OC1 (see FIG. 1), and timers 102A, 102B, and 102C each correspond to counter DC2 (see FIG. 1). Referring to FIG. 3, time synchronization (1), (2), and (3) illustrated in FIG. 1 will be described in more detail.

Control device 2A includes timer 102A, and field machines 90A, 90B, 90C include timers 91A, 91B, 91C, respectively. Timer 102A of control device 2A serves as a master, and timers 91A, 91B, 91C of field machines 90A, 90B, 90C are synchronized with the timing based on the master. For example, a value based on the timer value of timer 102A is set to timers 91A, 91B, 91C.

Control device 2B includes timer 102B, and field machines 90D, 90E, 90F include timers 91D, 91E, 91F, respectively. Timer 102B of control device 2B serves as a master, and timers 91D, 91E, 91F of field machines 90D, 90E, 90F are synchronized with the timing based on the master. For example, a value based on the timer value of timer 102B is set to timers 91D, 91E, 91F.

Control device 2C includes timer 102C, and field machines 90G, 90H, 90I include timers 91G, 91H, 91I, respectively. Timer 102C of control device 2C serves as a master, and timers 90G, 90H, 90I of field machines 91G, 91H, 91I are synchronized with the timing based on the master. For example, a value based on the timer value of timer 102C is set to timers 91G, 91H, 91I.

That is, control devices 2A, 2B, and 2C each serve as a master responsible for managing data transmission over a corresponding network 110, and field machine 90 connected to each control device 2 serves a slave that transmits data in accordance with an instruction from the master. The timers are time-synchronized with each other between the master and the slave, thereby allowing data transmission timings and the like to match with each other between control device 2 and field machine 90 that make up network 110.

In the example illustrated in FIG. 3, control device 2A further includes timer 101A time-synchronized with timer 102A. Control device 2B further includes timer 101B time-synchronized with timer 102B. Control device 2C further includes timer 101C time-synchronized with timer 102C (corresponding to time synchronization (2) in FIG. 3). In control system 1, for example, any one of timers 101A, 101B, and 101C may serve as a master of entire control system 1.

In FIG. 3, as an example, timer 101A of control device 2A is set as a master, and the timers of control devices 2B, 2C are time-synchronized with the master. This allows the plurality of control devices 2A, 2B, and 2C to be time-synchronized with each other (corresponding to time synchronization (1) in FIG. 3).

As described above, the plurality of control devices 2A, 2B, and 2C each include an inter-device timer (timers 101A, 101B and 101C) time-synchronized with each other among the plurality of control devices 2A, 2B, and 2C, and an inter-machine timer (timers 102A, 102B and 102C) time-synchronized with one or more field machines 90 connected over network 110, and the inter-device timer and the inter-machine timer are time-synchronized with each other. As a result, the inter-machine timer (timer 102A) time-synchronized between control device 2A and field machines 90A, 90B, 90C, the inter-machine timer (timer 102B) time-synchronized between control device 2B and field machines 90D, 90E, 90F, and the inter-machine timer (timer 102C) time-synchronized between control device 2C and field machines 90G, 90H, 90I are time-synchronized with each other.

Note that FIG. 2 illustrates a configuration example where the timer of any control device 2 is set as a master, but the time acquired from the outside over network 11 may be set as a master, or a timer of an external device such as device/line management device 190 may be set as a master.

C2. Time-Synchronized Data Communication

Figure 4:
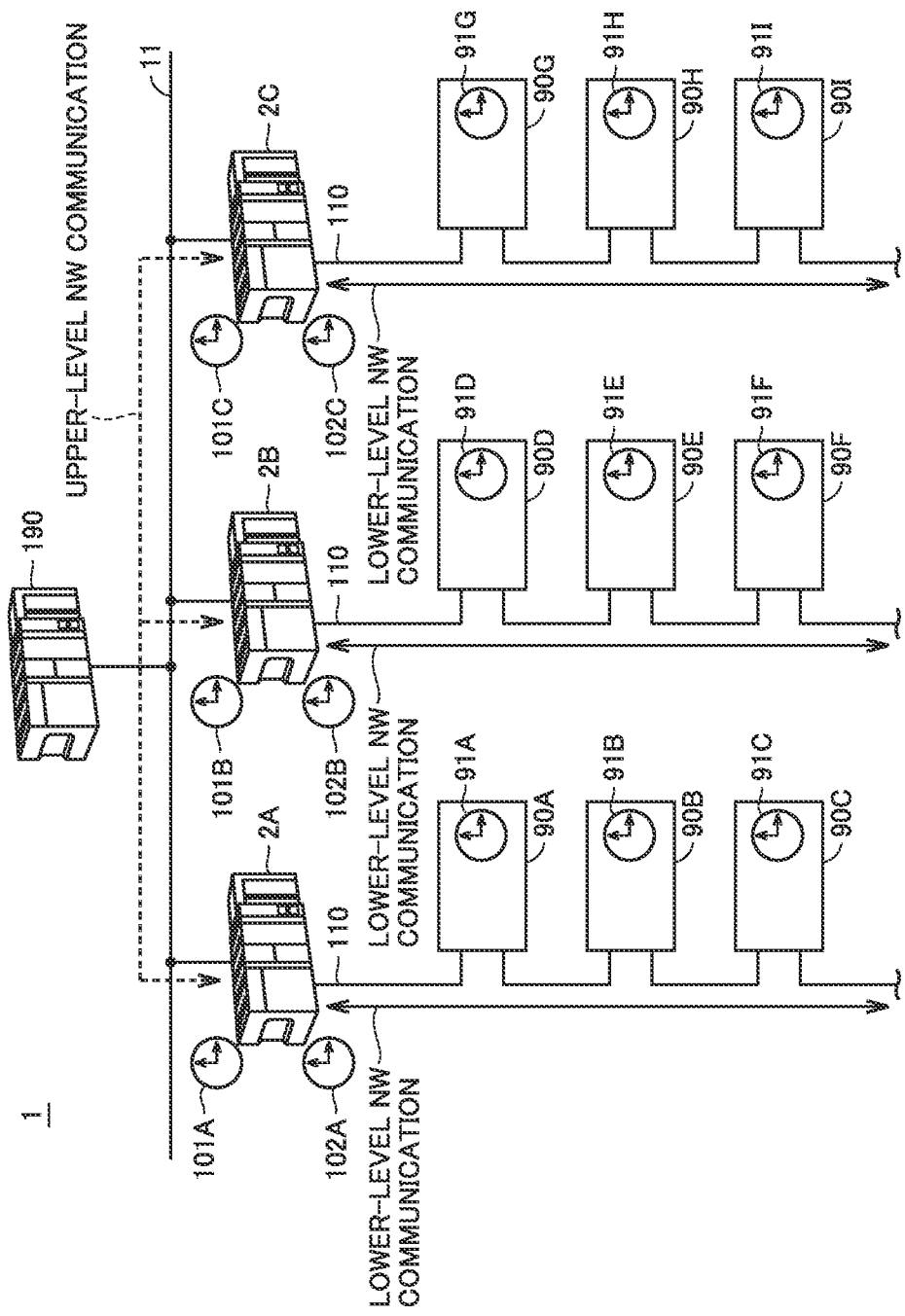
FIG. 4 is a diagram schematically illustrating data communication processing performed by control system 1 according to the present embodiment.

FIG. 4 is a diagram schematically illustrating data communication processing performed by control system 1 according to the present embodiment. Referring to FIG. 4, data is exchanged between control device 2A and the plurality of field machines 90A to 90C connected to network 110 at predetermined system intervals.

Data is exchanged at the predetermined system intervals between control device 2B and the plurality of field machines 90D to 90F and between control device 2C and field machines 90G to 90I. Such a data exchange puts control device 2 and field machine 90 into control operation. In the following description, communications on network 110 are also referred to as "lower-level network (NW) communications".

Among control devices 2A, 2B, and 2C connected to upper-level network 11, data collected from field machine 90 through the input processing performed by each control device 2, output data generated through the calculation processing, and the like are exchanged at the predetermined system intervals. Such a data exchange allows field machine 90 connected to control device 2A, field machine 90 connected to control device 2B, and field machine 90 connected to control device 2C to operate in a coordinated manner. That is, this allows field machines 90 to operate in a coordinated manner between different processes. In the following description, communications on network 11 are also referred to as "upper-level network (NW) communications".

In control system 1 according to the present embodiment, the start timing of data transmission over the lower-level network communications is determined based on the timers time-synchronized with each other among the plurality of control devices 2A, 2B, and 2C. This allows, among the plurality of control devices 2A, 2B, and 2C, the timings for exchanging data with field machines 90 and the like to match with each other, so that the timings for controlling field machines 90 can be synchronized with each other between different processes.

D. Configuration and Time Synchronization of Control Device 2

Figure 5:
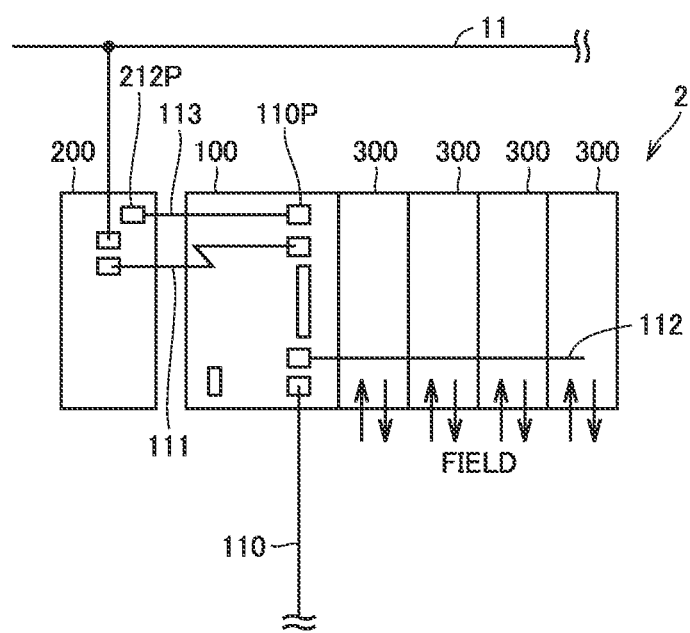
FIG. 5 is a diagram schematically illustrating an example of a configuration of each unit of a control device 2 according to the present embodiment.

FIG. 5 is a diagram schematically illustrating an example of a configuration of each unit of control device 2 according to the present embodiment. Referring to FIG. 5, control device 2 provided in control system 1 includes a unit 100 (hereinafter, referred to as CPU unit 100) of a central processing unit (CPU), one or more function units 200, and one or more function units 300. In FIG. 5, the number of function units 300 provided in control device 2 is four, but may be one, or two or more, and the number of function units 200 provided in control device 2 is one, but may be two or more. CPU unit 100 connects to one or more function units 200 over data bus 111 and signal line 113. Further, CPU unit 100 connects to one or more function units 300 over a data bus 112.

Data bus 111 is, but not limited to, a bus of an I/O serial interface adhering to, for example, PCI Express (PCIe). Signal line 113 is an optical fiber cable or an electrical signal cable, and transmits a time synchronization signal 130 serving as a trigger signal.

CPU unit 100 includes a program execution unit that executes a program created to adapt to the control target. More specifically, CPU unit 100 corresponds to an operation processing unit that executes a system program and various user programs.

Function unit 200 is responsible for communication processing or information processing. Function unit 200 includes an interface that connects to data bus 111 and a signal port 212P that connects to signal line 113. Function unit 200 is disposed between network 11 and control device 2, so that CPU unit 100 can communicate data with a device connected to network 11 via function unit 200. Further, signal line 113 is connected between a signal port 110P of CPU unit 100 and signal port 212P of function unit 200, so that CPU unit 100 and function unit 200 receive time synchronization signal 130 over signal line 113.

According to the present embodiment, function unit 200 monitors access to CPU unit 100 from the Internet such as network 14 and access to CPU unit 100 from another device in network 11, and notifies, when detecting any security incident, the inside or the outside of control device 2 of the security incident thus detected. Note that the information processing performed by function unit 200 is not limited to the security monitoring processing.

Function unit 300 serves as a so-called I/O unit that exchanges signals with a facility and apparatus to be controlled such as field machine 90 and various devices (sensors, actuators, and the like) contained in the facility and apparatus. Specifically, function unit 300 outputs a manipulated variable calculated by CPU unit 100 to the field or collects an input value from the field. Function unit 300 includes, for example, at lease one of a digital input (DI) module that receives a digital signal from the control target, a digital output (DO) module that outputs a digital signal to the control target, an analog input (AI) module that receives an analog signal from the control target, or an analog output (AO) module that outputs an analog signal to the control target. Furthermore, function unit 300 may include a controller having a special function such as proportional integral derivative (PID) control or motion control implemented therein.

Function unit 200 or function unit 300 may be provided as an expansion unit that can be externally attached to CPU unit 100 in a detachable manner.

D1. Configuration of CPU Unit 100

Figure 6:
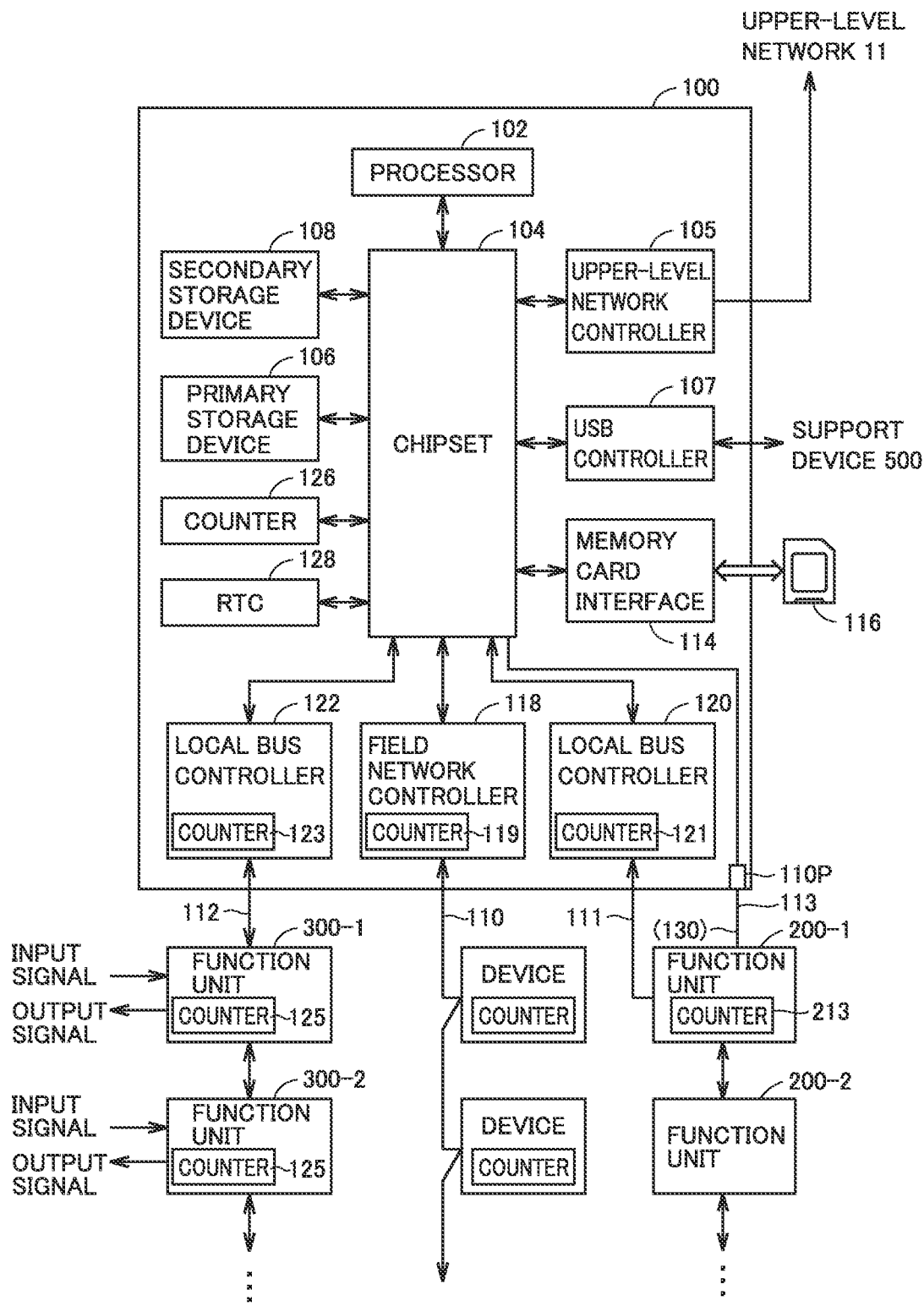
FIG. 6 is a block diagram illustrating an example of a hardware configuration of a CPU unit 100 provided in control device 2 according to the present embodiment.

FIG. 6 is a block diagram illustrating an example of a hardware configuration of CPU unit 100 provided in control device 2 according to the present embodiment.

CPU unit 100 includes a processor 102, a chipset 104, a primary storage device 106, a secondary storage device 108, an upper-level network controller 105, a universal serial bus (USB) controller 107, a memory card interface 114, local bus controllers 120, 122, a field network controller 118, a counter 126, a real time clock (RTC) 128, and signal port 110P.

Processor 102 includes a CPU, a microprocessor unit (MPU), a graphics processing unit (GPU), or the like, and reads various programs stored in secondary storage device 108, deploys the programs into primary storage device 106, and executes the programs to perform control and various processing on the control target as described later. Secondary storage device 108 includes, for example, a non-volatile storage device such as a hard disk drive (HDD) or a solid state drive (SSD). Primary storage device 106 includes a volatile storage device such as a dynamic random access memory (DRAM) or a static random access memory (SRAM).

Chipset 104 controls processor 102 and each device to perform processing all over CPU unit 100.

Secondary storage device 108 stores a user program created to adapt to a manufacturing device or facility to be controlled, in addition to the system program responsible for providing basic functions. Further, secondary storage device 108 also stores a time-series database as described later.

Upper-level network controller 105 exchanges data with manufacturing execution system 400 or a device on the cloud (see FIG. 1) over upper-level network 11. USB controller 107 controls data exchanges with support device 500 over a USB connection.

Memory card interface 114 is configured to receive a memory card 116 in a detachable manner and is capable of writing data to memory card 116 and reading various data (such as the user program or trace data) from memory card 116.

Counter 126 is used as a time reference for use in managing the execution timing at which various processing is performed in CPU unit 100. Counter 126 typically increments or decrements a counter value at predetermined intervals. CPU unit 100 may have counter 126 implemented by a high precision event timer (HPET) that is a hardware timer provided on a system bus that drives processor 102, or by a dedicated circuit such as an application specific integrated circuit (ASIC) or a field-programmable gate array (FPGA).

RTC 128 is a type of counter capable of measuring the passage of time, and provides the current time to processor 102 and the like.

Local bus controller 122 is an interface that exchanges data with function unit 300-1, 300-2, . . . connectable to CPU unit 100. Local bus controller 122 includes counter 123 used as a time reference for use in managing timing with function units 300-1, 300-2, . . . that are other devices connected over data bus 112. Likewise, each of function units 300-1, 300-2, . . . includes counter 125 used as a time reference for use in managing timing with local bus controller 122 and other function units 300. Counter 123 and counter 125 may be the same in configuration as counter 126 described above.

Field network controller 118 controls data exchanges with other devices including field machine 90 over network 110. Field network controller 118 includes a counter 119 used as a time reference for use in managing timing with the other devices.

Local bus controller 120 is an interface that exchanges data with function units 200-1, 200-2, . . . connectable to CPU unit 100. Local bus controller 120 includes a counter 121 used as a time reference for use in managing timing with function units 200-1, 200-2, . . . that are other devices connected over data bus 111. Likewise, each of function units 200-1, 200-2, . . . includes a counter 213 used as a time reference for use in managing timing with local bus controller 120. Counter 121 and counter 213 may be the same in configuration as counter 126 described above.

Further, each device on network 110 also includes a counter used as a time reference for use in managing timing with field network controller 118.

Counter 119 and the counter provided in each device may be the same in configuration as counter 126 described above.

Field network controller 118 serves as a communication master responsible for periodic communications over network 110, and field network controller 118 continuously checks a difference between the counter value indicated by the counter provided in each device connected to a field bus and the counter value indicated by counter 119, and outputs, as needed, a synchronization signal for instructing a device having a difference in counter value to correct the counter value. As described above, field network controller 118 has a synchronization management function of issuing an instruction to a device to match the counter value indicated by the counter of the device with the counter value indicated by counter 119.

Signal port 110P is connected to signal line 113 over which time synchronization signal 130 is transmitted.

In CPU unit 100 illustrated in FIG. 6, counter 119, counter 121, and counter 123 are synchronized with counter 126.

FIG. 6 illustrates the configuration example where processor 102 executes a program to provide necessary functions, but, in CPU unit 100, some or all of the functions thus provided may be implemented by a dedicated hardware circuit (for example, an application specific integrated circuit (ASIC), a field-programmable gate array (FPGA), or the like). Alternatively, a core part of CPU unit 100 may be implemented by hardware having a general-purpose architecture (for example, an industrial personal computer based on a general-purpose personal computer). Further, a plurality of operating systems (OSs) having different uses may be executed in parallel using a virtualization technology, and a necessary application may be executed on each OS.

Control system 1 according to the present embodiment has a configuration where CPU unit 100 and support device 500 are separately provided, or alternatively, may have a configuration where all or some of the functions of CPU unit 100 and support device 500 are integrated into a single device.

D2. Configuration of Function Unit 200

Figure 7:
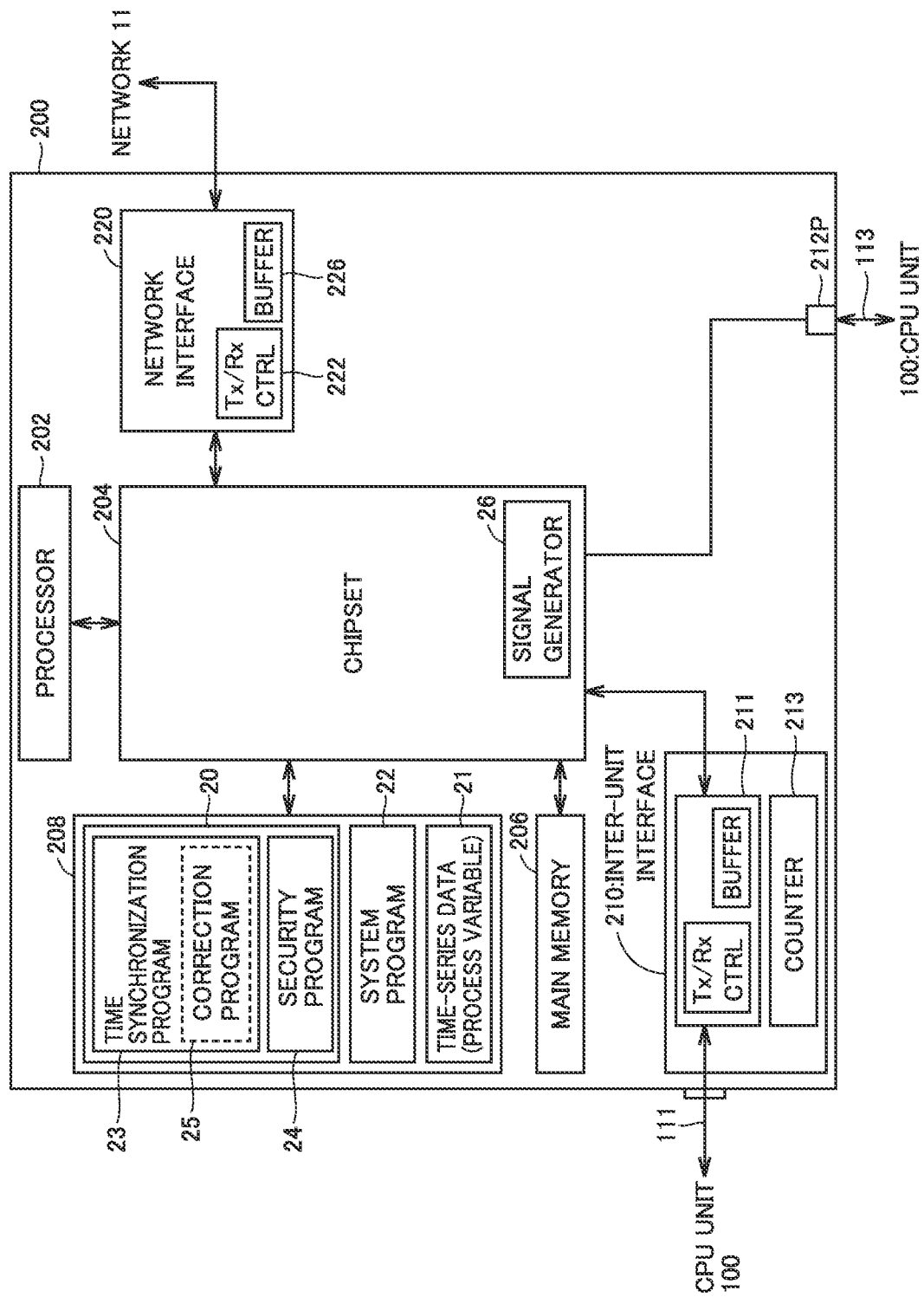
FIG. 7 is a block diagram illustrating an example of a hardware configuration of a function unit 200 provided in control device 2 according to the present embodiment.

FIG. 7 is a block diagram illustrating an example of a hardware configuration of function unit 200 provided in control device 2 according to the present embodiment. Referring to FIG. 7, function unit 200 includes a processor 202, a chipset 204, a main memory 206, a storage 208, an inter-unit interface 210, a network interface 220, and signal port 212P. Signal port 212P is connected to signal line 113 over which time synchronization signal 130 is transmitted.

Processor 202 includes a CPU, an MPU, a GPU, or the like. As with CPU unit 100 described above, function unit 200 includes one or more processors 202 and/or processor 202 having one or more cores. Chipset 204 controls processor 202 and peripheral elements to perform processing all over function unit 200. Chipset 204 includes a signal generator 26 that is a circuit element responsible for generating time synchronization signal 130. Time synchronization signal 130 is transmitted from signal generator 26 to signal line 113 via signal port 212P. Main memory 206 includes a volatile storage device such as a DRAM or an SRAM. Storage 208 includes, for example, a non-volatile storage device such as a flash memory.

Processor 202 reads various programs stored in storage 208, deploys the programs into main memory 206, and executes the programs to perform processing such as monitoring of a security incident. Storage 208 stores a system program 22 for implementing basic processing and a user program 20. Further, storage 208 includes a storage area 21 where time-series data of process variables collected by function unit 200 are stored.

User program 20 includes a time synchronization program 23 for controlling time synchronization between units and a security program 24 for security monitoring processing. Time synchronization program 23 includes a correction program 25 that is executed to implement a correction unit 20A or a correction unit 20B to be described later. Further, security program 24 performs the security monitoring processing based on security settings containing a rule or the like predefined by an operator, an administrator, or the like of control device 2 to collect process variables based on a result of the processing and store the process variables in storage area 21 as time-series data.

Inter-unit interface 210 connects to data bus 111. Inter-unit interface 210 exchanges data with CPU unit 100 over data bus 111.

Inter-unit interface 210 includes a data communication circuit 211 including a controller (Tx/Rx CTRL) for transmitting and receiving data to and from CPU unit 100 or other function units 200 and a buffer, and counter 213.

Network interface 220 includes controller (Tx/Rx CTRL) 222 and a buffer 226 for exchanging data over network 11.

The buffers provided in inter-unit interface 210 and network interface 220 each correspond to a storage unit that temporarily stores data to be transmitted, received data, and the like. Counter 213 is the same in configuration as counter 126 (see FIG. 6) provided in CPU unit 100.

Network interface 220 and inter-unit interface 210 of function unit 200 may include a network interface card (NIC). FIG. 7 illustrates the configuration example where processor 202 executes a program to perform necessary processing, but some or all of the processing thus provided may be implemented by a dedicated hardware circuit (for example, an ASIC or an FPGA).

D3. Configuration of Function Unit 300

Figure 8:
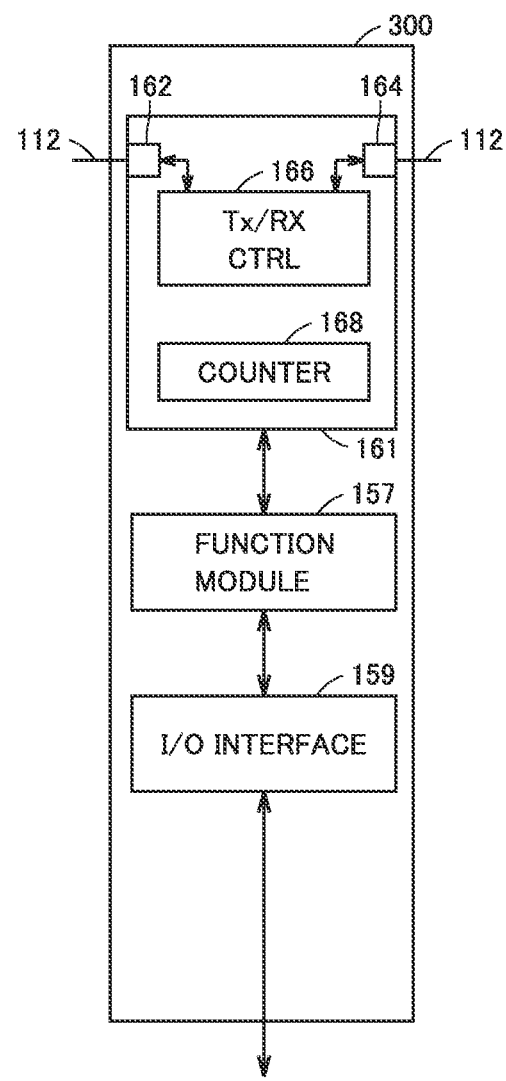
FIG. 8 is a block diagram illustrating an example of a hardware configuration of a function unit 300 provided in control device 2 according to the present embodiment.

FIG. 8 is a block diagram illustrating an example of a hardware configuration of function unit 300 provided in control device 2 according to the present embodiment. Referring to FIG. 8, function unit 300 provides various functions necessary for enabling control system 1 to control various machines, facilities, and the like. More specifically, each function unit 300 includes a function module 157, an I/O interface 159, and a communication circuit 161.

Function module 157 is a module that performs main processing of each function unit 300 and is responsible for collecting field information from the control target such as a machine or a facility and outputting an instruction signal to the control target such as a machine or a facility.

I/O interface 159 is a circuit serving as an interface for exchanging signals with the control target such as a machine or a facility.

Communication circuit 161 is responsible for processing data sequentially transferred over data bus 112. That is, upon receipt of any data over data bus 112, communication circuit 161 processes the data thus received and then transmits the communication data to next function unit 300 on data bus 112. Communication circuit 161 provides a function of relaying such data.

More specifically, communication circuit 161 includes transmission/reception ports 162, 164, a controller 166 for transmission/reception, and a counter 168.

Transmission/reception ports 162, 164 are ports physically connected to data bus 112 and are responsible for sequential transfer of data by performing processing such as reception and reproduction of data transmitted over data bus 112 in accordance with an instruction from controller 166.

Controller 166 reads data transferred over data bus 112 and performs data processing such as manipulation of data.

Counter 168 generates a clock serving as a reference of timing at which controller 166 outputs an instruction or function module 157 performs processing. As counter 168, for example, a counter based on a real-time clock is applicable, but according to the present embodiment, a free-run counter that counts up (increments) at predetermined intervals is applicable.

D4. Example of Software Configuration of CPU Unit 100

Next, an example of a software configuration of CPU unit 100 that is a part of control system 1 according to the present embodiment will be described.

Figure 9:
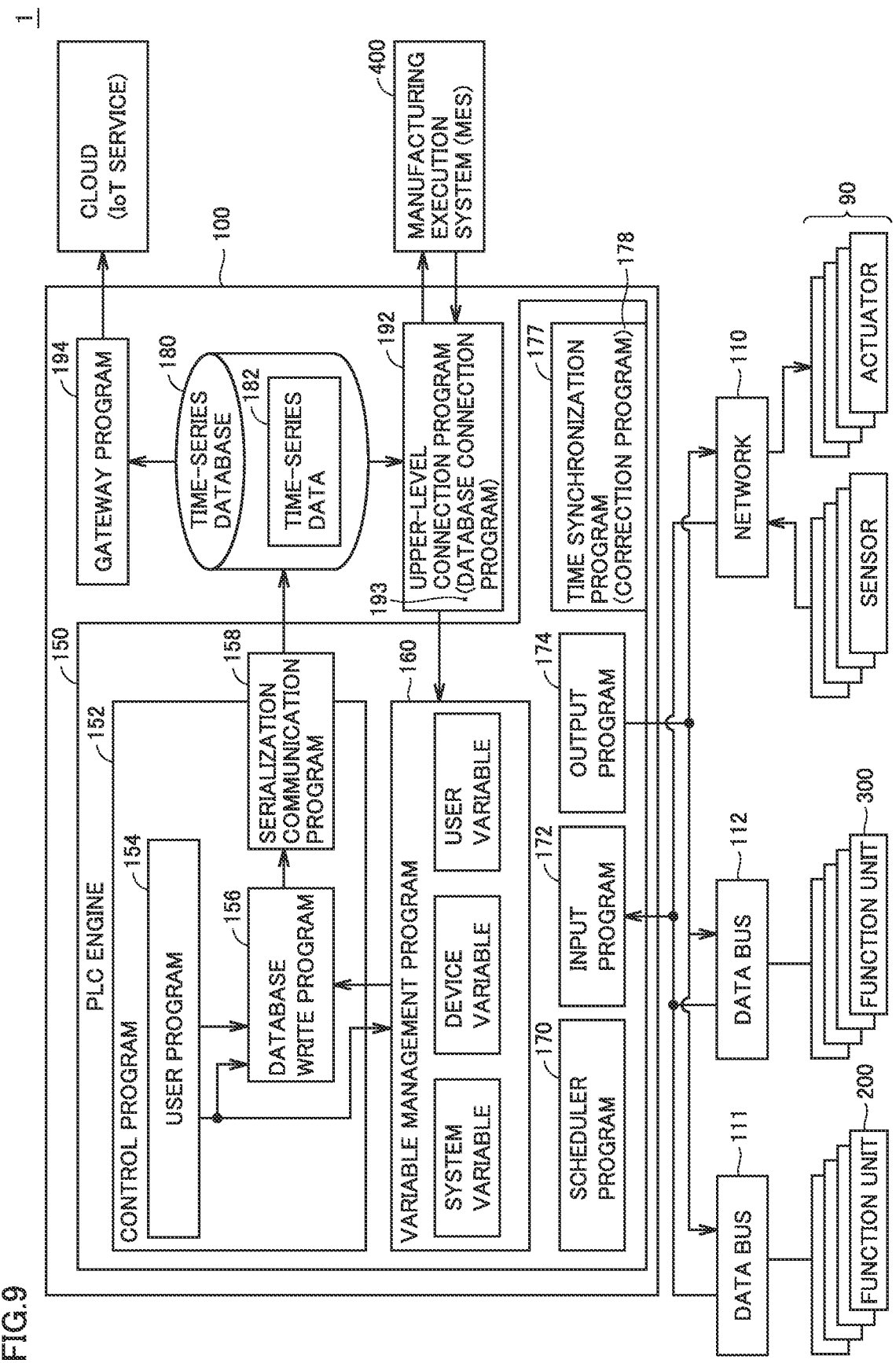
FIG. 9 is a block diagram illustrating an example of a software configuration of CPU unit 100 according to the present embodiment.

FIG. 9 is a block diagram illustrating an example of the software configuration of CPU unit 100 according to the present embodiment. Referring to FIG. 9, CPU unit 100 includes a PLC engine 150, a time-series database 180, an upper-level connection program 192, and a gateway program 194.

Typically, PLC engine 150 causes processor 102 of CPU unit 100 to read the system program stored in secondary storage device 108, deploy the system program into primary storage device 106, and execute the system program to provide a runtime environment of various programs, thereby allowing various programs to be executed under the runtime environment.

More specifically, PLC engine 150 includes a control program 152, a variable management program 160, a scheduler program 170, an input program 172, an output program 174, and a time synchronization program 177. Variable management program 160, scheduler program 170, input program 172, and output program 174 may be implemented as part of the system program. In this case, each function provided by such programs may be provided by the monolithic system program.

Control program 152 typically includes a user program 154, a database write program 156, and a serialization communication program 158. User program 154 corresponds to a main part that provides a control operation function and may be configured, as desired, to adapt to the control target of CPU unit 100 such as a manufacturing device or a facility. User program 154 may be defined by, for example, a ladder logic using function blocks or the like.

Database write program 156 is invoked by an instruction defined in user program 154 to write designated data to time-series database 180.

Serialization communication program 158 performs serialization processing on data to be written by database write program 156 to time-series database 180. More specifically, serialization communication program 158 performs processing (serialization) of converting the time-series data into a byte sequence that can be stored. Target data is converted into a predetermined byte sequence by the serialization processing and then stored in time-series database 180. Note that whether the serialization processing needs to be performed depends on the throughput of data write to time-series database 180, the data size, or the like. That is, serialization communication program 158 is optional.

Variable management program 160 manages values available to PLC engine 150 in the form of variables. More specifically, variable management program 160 manages a system variable indicating a state of CPU unit 100 or the like, a device variable indicating a value held by various devices connected to CPU unit 100 over the local bus or the field bus, and a user variable indicating a value held by user program 154 executed by CPU unit 100.

Input program 172 provides a function of acquiring input data from various devices connected to CPU unit 100 over the local bus or the field bus.

Output program 174 outputs a manipulated variable (output data) calculated by user program 154 executed by CPU unit 100 to the target device connected over data bus 112 or network 110.

During the execution of the control program in CPU unit 100, time synchronization program 177 causes CPU unit 100, function unit 200 connected to data bus 111, function unit 300 connected to data bus 112, and field machine 90 connected to network 110 to be time-synchronized with each other. Time synchronization program 177 includes a correction program 178 for correcting, as needed, a timer managed for time synchronization. Correction program 178 is executed to implement a correction unit 10B to be described later. Correction processing performed by correction unit 10B will be described later.

Scheduler program 170 manages resource allocation, execution timing, and the like for a process, a task, or the like of CPU unit 100. Such a process or task includes a process or task that may be created by control program 152, variable management program 160, input program 172, output program 174, time synchronization program 177, and the like running on CPU unit 100.

Time-series database 180 is typically deployed in primary storage device 106 or secondary storage device 108 and has a function of storing data and a function of retrieving designated data in response to a request (query) from the outside. Time-series database 180 stores time-series data 182 written by database write program 156. That is, time-series database 180 stores at least some of input data, output data, operation data calculated through the control operation performed by control program 152, manufacturing data, or event data in chronological order. Such input data and output data include data received by CPU unit 100 from function unit 300 and data transmitted by CPU unit 100 to function unit 300. Further, the event data may include data on security monitoring received by CPU unit 100 from function unit 200.

Upper-level connection program 192 exchanges data with an external device connected to upper-level network 13 such as manufacturing execution system 400. CPU unit 100 according to the present embodiment can output input data or operation data to manufacturing execution system 400 and receive manufacturing information from manufacturing execution system 400. As described above, upper-level connection program 192 provides a manufacturing data acquisition function of acquiring manufacturing data from manufacturing execution system 400 associated with the control target.

According to the present embodiment, manufacturing execution system 400 includes time-series DB 450. In this case, a database connection program 193 may be provided instead of upper-level connection program 192 or as part of upper-level connection program 192. For example, database connection program 193 may perform processing of transmitting a query such as SQL to a relational database and receiving a response from the relational database. The execution of database connection program 193 allows time-series data 182 of time-series database 180 in CPU unit 100 to be transferred to manufacturing execution system 400 and stored in time-series DB 450. Details of the time-series data output to manufacturing execution system 400 by database connection program 193 will be described later.

Gateway program 194 communicates with a device on the cloud. For example, time-series data 182 of time-series database 180 is provided to a device that provides an IoT service on the cloud. Specifically, gateway program 194 acquires data of a designated type from time-series database 180 at designated intervals, and outputs the data as time-series data. The time-series data output to the IoT service providing device by gateway program 194 may be the same in structure as, for example, the time-series data output to manufacturing execution system 400 by database connection program 193.

Input program 172 of CPU unit 100 acquires input data from field machine 90 such as a sensor over data buses 111, 112 and/or network 110.

Upper-level connection program 192 of CPU unit 100 acquires manufacturing data from manufacturing execution system 400. Variable management program 160 manages the input data and manufacturing data thus acquired as variables.

User program 154 performs a control operation designated in advance while referring to the system variable, the device variable, and the user variable managed by variable management program 160, and outputs a result of the control operation (output data) to variable management program 160.

Output program 174 outputs output data calculated through the control operation performed by user program 154 to field machine 90 such as an actuator over data bus 112 and/or network 110 as a control output.

Database write program 156 writes, to time-series database 180, a process variable designated from among the variables managed by variable management program 160.

Upper-level connection program 192 outputs a value of a variable designated from among the variables managed by variable management program 160 and/or data designated from among time-series data 182 stored in time-series database 180 to manufacturing execution system 400 as time-series data.

Gateway program 194 outputs the value of the variable designated from among the variables managed by variable management program 160 and/or the data designated from among time-series data 182 stored in time-series database 180 to the IoT service as time-series data. The IoT service providing device performs behavior analysis based on, for example, time-series data output from CPU unit 100 to provide a predictive maintenance service or the like for the control target such as a facility or a device.

D5. Configuration for Time Synchronization

First, control device 2 according to the present embodiment has a function of synchronizing times and a function of synchronizing counters (hereinafter, also referred to as "time synchronization" and "counter synchronization", respectively).

Herein, the "time" represents a certain point in time and is measured in hours, minutes, and seconds. The "counter" contains a value for controlling timing in control device 2 and a related device, and basically indicates a value incremented or decremented by a predetermined value every predetermined unit time (hereinafter, the value indicated by the counter is also referred to as a "counter value"). According to the present embodiment, the counter value corresponds to, but not limited to, the value of a timer and represents, for example, a 64-bit integer value that can represent a value in the order of nanoseconds.

Basically speaking, the time synchronization is less in accuracy than the counter synchronization, so that time synchronization using the counter value is applied to time synchronization between the units making up control device 2 and between each unit and other devices including field machine 90 according to the present embodiment.

Figure 10A:
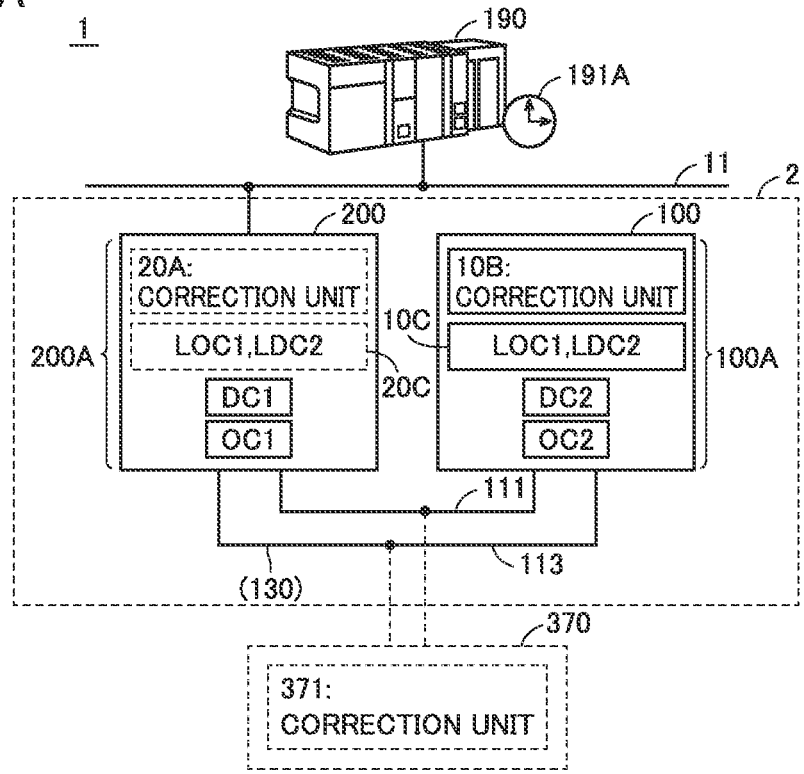
FIG. 10A is a diagram schematically illustrating an example of a configuration for time synchronization managed by control device 2 according to the present embodiment.
Figure 10B:
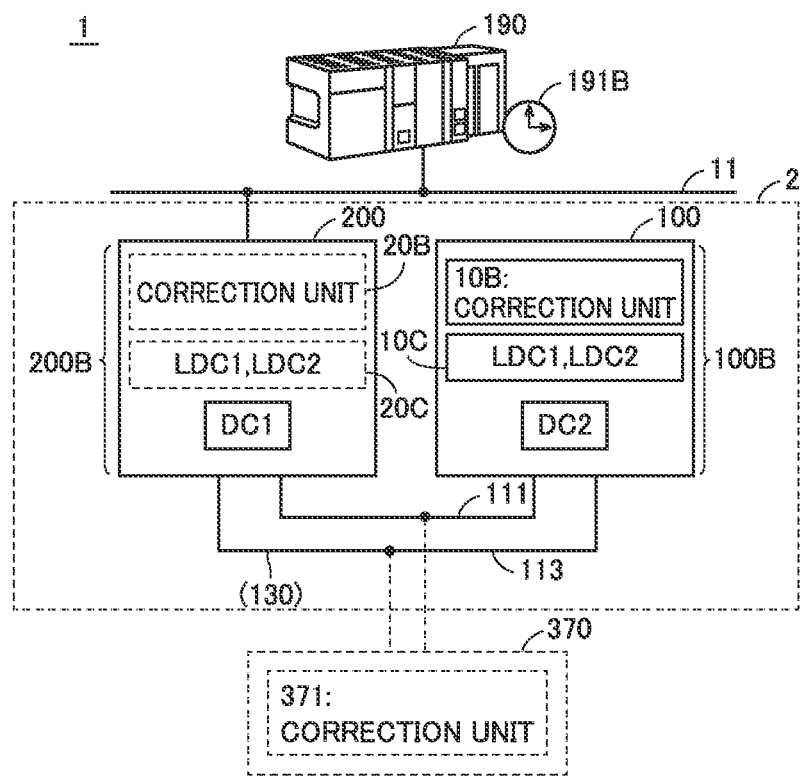
FIG. 10B is a diagram schematically illustrating an example of the configuration for time synchronization managed by control device 2 according to the present embodiment.

FIGS. 10A and 10B are diagrams schematically illustrating examples of the configuration for time synchronization managed by control device 2 according to the present embodiment. Referring to FIGS. 10A and 10B, a configuration for each control device 2 to acquire the counter value of the master clock over network 11 and a configuration for making time synchronization in response to time synchronization signal 130 will be described. In FIGS. 10A and 10B, time synchronization signal 130 is generated by signal generator 26 (see FIG. 7) of function unit 200 and transmitted over signal line 113.

Such a configuration for making time synchronization will be described with reference to, for example, separate cases including a case where a master clock of Time-Sensitive Networking (TSN) is provided to control device 2 over network 11 (see FIG. 10A) and a case where a master clock of EtherCAT (registered trademark: Ethernet for Control Automation Technology) is provided to control device 2 over network 11 (see FIG. 10B). Note that the master clock provided to control device 2 over network 11 need not adhere to such standards, and may adhere to IEEE1588.

First, referring to FIG. 10A, suppose that master clock 191A of TSN is provided by, for example, device/line management device 190 on network 11. Master clock 191A indicates the absolute time managed by, for example, a time synchronization server provided on the Internet. Note that master clock 191A may be a separate device provided on network 11.

Function unit 200 includes a synchronization processing unit 200A implemented through execution of time synchronization program 23. Synchronization processing unit 200A communicates with device/line management device 190 via network interface 220 to refer to master clock 191A. Further, synchronization processing unit 200A includes a counter DC1 and counter OC1. Synchronization processing unit 200A may include correction unit 20A that corrects the counter value. Counter DC1 and counter OC1 correspond to, for example, counter 213 (see FIG. 6 or 7).

CPU unit 100 further includes a synchronization processing unit 100A implemented through execution of time synchronization program 177. Synchronization processing unit 100A includes correction unit 10B, a storage area 10C, counter DC2, and a counter OC2. Counter DC2 corresponds to counter 119 and counter 123 (see FIG. 6). Counter DC2 further corresponds to a counter (counter 126 illustrated in FIG. 6 or the like) that scheduler program 170 refers to for scheduling the execution timing of control program 152 or the like. Further, counter OC2 corresponds to counter 121 (see FIG. 6). Note that counters OC1, OC2 each correspond to a counter implemented by an ordinary clock, and counters DC1, DC2 each correspond to a counter implemented by a distributed clock.

Synchronization processing unit 200A corrects a transmission delay on network 11 or the like when acquiring the time of master clock 191A using the function of device/line management device 190 serving as the time synchronization server. This allows synchronization processing unit 200A to acquire a more accurate time from master clock 191A. Synchronization processing unit 200A sets counter OC1 at a counter value based on the time acquired from master clock 191A. Synchronization processing unit 200A periodically acquires the time of master clock 191A from device/line management device 190 and sets counter OC1 at the time.

This allows synchronization processing unit 200A of function unit 200 to synchronize counter OC1 with master clock 191A.

Function unit 200 serves as a time synchronization server for CPU unit 100. That is, synchronization processing unit 200A periodically transmits the counter value of counter OC1 to data bus 111. This allows function unit 200 to provide the counter value (that is, the counter value of counter OC1) synchronized with master clock 191A to CPU unit 100 connected to data bus 111.

On the other hand, synchronization processing unit 100A of CPU unit 100 receives the timer value of counter OC1 over data bus 111 at startup and sets counter OC2 at the timer value thus received, for example. Subsequently, synchronization processing unit 100A periodically updates (increment or decrement) the counter value of counter OC2 in synchronization with the output from the internal hardware circuit, and sets counter DC2 at the updated value. This causes the counter value of counter DC2 to be periodically updated.

Therefore, in CPU unit 100, since synchronization processing unit 100A synchronizes counter OC2 and counter DC2 with counter OC1 synchronized with master clock 191A, counter DC2 can be synchronized with master clock 191A.

CPU unit 100 performs program scheduling based on the synchronization between master clock 191A and counters described above. This will be described with reference to FIGS. 6 and 9. More specifically, scheduler program 170 performs scheduling of control program 152 and the like based on counter 126. Further, input program 172 and output program 174 are time-synchronized with each device based on counter 119 and counter 123 synchronized with counter 126. This allows scheduling of control program 152 and the like and time synchronization between each device connected to control device 2 and control device 2 in CPU unit 100 to be performed based on master clock 191A. This in turn allows scheduling of the control program and the like and input/output between each device connected to control device 2 and control device 2 in CPU unit 100 to be performed in synchronization with master clock 191A.

D6. Correction of counter based on time synchronization signal

According to the present embodiment, the counter value of counter DC2 is updated in synchronization with the output signal of the internal hardware circuit of CPU unit 100, for example. This may cause a difference between the counter value of counter OC1 of function unit 200 and the counter value of counter DC2 of CPU unit 100 (hereinafter, also referred to as a synchronization mismatch) to increase due to an error in the hardware circuit or the like. An increase in the synchronization mismatch prevents scheduling of the control program and input/output between each device connected to control device 2 and control device 2 in CPU unit 100 from being performed in synchronization with master clock 191A. Note that the cause of the difference is not limited to an error in the hardware circuit or the like.

In order to prevent such a case, synchronization processing unit 100A corrects the counter value of counter DC2 using a value for reducing the synchronization mismatch (hereinafter, also referred to as an adjustment value D). Specifically, upon receipt of time synchronization signal 130 over signal line 113, correction unit 10B performs correction processing including latch processing.

During the latch processing, correction unit 10B latches (acquires) the counter value of counter DC2 and stores counter value LDC2 thus latched in storage area 10C. Further, during the latch processing, correction unit 10B latches (receives) the counter value of counter OC1 transmitted over data bus 111 and stores counter value LOC1 thus latched in storage area 10C.

During the correction processing, adjustment value D (positive value or negative value) is added to the latched counter value, and counter DC2 is set at the value obtained as a result of the addition.

As the correction, adjustment value D described above may be divided into N (N≥2) values, and each value Di (i=1, 2, 3, ... N) obtained as a result of the division may be added to the counter value of counter DC2 periodically and cumulatively. Accordingly, the addition is repeated N times, allowing the counter value of counter DC2 to change gradually (smoothly).

Further, as the correction, adjustment value D may be added to the counter value of counter DC2 with a designated frequency.

Note that adjustment value D described above is constant or variable. Examples of the variable include a value determined based on the magnitude of the difference between latched counter values LOC1 and LDC2. Further, the above-described "N" may be constant or variable, and examples of the variable include a value determined based on the magnitude of adjustment value D.

Further, correction unit 10B may detect the tendency of variation (drift-like fluctuations) in the difference between counter values LOC1 and LDC2 calculated for each reception of time synchronization signal 130 and determine adjustment value D or "N" described above based on the variations. That is, adjustment value D or "N" described above is determined so as to make the synchronization mismatch calculated for each reception of time synchronization signal 130 smaller, that is, to cause the difference in the synchronization mismatch to converge to a predetermined value. For example, adjustment value D is made larger or "N" is made smaller as the range of fluctuations increases, thereby allowing a reduction in the synchronization mismatch and thus allowing the synchronization mismatch to quickly converge to the predetermined value.

Further, the correction may include initialization of counter DC2 by setting counter DC2 at adjustment value D describe above.

Further, the correction processing may be performed upon receipt of time synchronization signal 130 or after a lapse of a predetermined time from the reception of time synchronization signal 130.

Further, the transmission source unit of time synchronization signal 130 is not limited to function unit 200, and may be another unit provided in control system 1 illustrated in FIG. 1. For example, the transmission source unit may be a designated trigger signal generation device (not illustrated) provided in control system 1 illustrated in FIG. 1, any one of control devices 2 (CPU unit 100 or function unit 200, 300 (see FIG. 5) of control device 2), or device/line management device 190. Further, according to the present embodiment, time synchronization signal 130 is periodically output, for example, every 1 msec, but is not limited to such periodical output. For example, the transmission source unit of time synchronization signal 130 may output time synchronization signal 130 when the counter value of counter OC1 of synchronization processing unit 200A of function unit 200 becomes equal to a certain indicated value.

D7. Another Example of Configuration for Time Synchronization

In FIG. 10A, the time is acquired from master clock 191A provided by TSN, but a path over which the time of the master is acquired for time synchronization is not limited to TSN. For example, as illustrated in FIG. 10B, the time may be acquired from master clock 191B of EtherCAT. Master clock 191B of EtherCAT is synchronized with the absolute time. In FIG. 10B, counters DC1 and DC2 are used for time synchronization.

Referring to FIG. 10B, a synchronization processing unit 200B of function unit 200 periodically corrects a propagation delay and acquires the time of master clock 191B. Synchronization processing unit 200B sets counter DC1 at a counter value indicating the time thus acquired. Synchronization processing unit 200B periodically reads the counter value of counter DC1 and transmits the counter value to data bus 111. In FIG. 10B, counter DC1 corresponds to counter 213 (see FIG. 6). Further, counter DC2 corresponds to counters 119, 121, and 123 (see FIG. 6) and the counter (counter 126 or the like in FIG. 6) that scheduler program 170 refers to for scheduling the execution timing of control program 152 and the like in FIG. 9.

At startup or the like, a synchronization processing unit 100B of CPU unit 100 sets counter DC2 at the counter value received over data bus 111. Subsequently, the synchronization processing unit 100B updates (incremented or decremented) the value of counter DC2 in synchronization with the output of the internal hardware circuit. This causes the counter value of counter DC2 to be periodically updated. Further, upon receipt of time synchronization signal 130 over signal line 113, correction unit 10B of synchronization processing unit 100B latches the counter value received over data bus 111 and stores the counter value in storage area 10C as a latched counter value LDC1. Further, upon receipt of time synchronization signal 130, correction unit 10B latches the counter value of counter DC2 and stores the counter value in storage area 10C as latched counter value LDC2.

During the correction processing in correction unit 10B, correction similar to the correction illustrated in FIG. 10A can be performed. In FIG. 10B, adjustment value D for use in correction may include a value determined based on the magnitude of the difference (synchronization mismatch) between latched counter values LDC1 and LDC2.

Further, correction unit 10B may detect a trend of variations (drift-like fluctuations) in the difference between latched counter values LDC1 and LDC2 calculated for each reception of time synchronization signal 130 and determine adjustment value D or "N" described above based on the variations. For example, adjustment value D or "N" described above may be determined so as to make the difference calculated for each reception of time synchronization signal 130 smaller, that is, to cause the difference to converge to a predetermined value.

Further, the correction may include initialization of counter DC2 by setting counter DC2 with the adjustment value.

Further, even in the configuration illustrated in FIG. 10B, the timing for performing the correction processing may be the same as in FIG. 10A. Further, in FIG. 10B, for example, time synchronization signal 130 may be output to signal line 113 when the counter value of counter DC1 becomes equal to a certain indicated value.

D8. Another Example of Correction of Counter Based on Time Synchronization Signal In FIGS. 10A and 10B, the configuration where the correction processing is performed is not limited to the configuration where correction unit 10B of CPU unit 100 performs the correction processing, and may be a configuration where the correction processing is performed using correction unit 20A and a storage unit 20C of function unit 200.

Specifically, referring to FIG. 10A, synchronization processing unit 100A of CPU unit 100 periodically transmits the counter value of counter DC2 to data bus 111. Upon receipt of time synchronization signal 130 from signal line 113, correction unit 20A performs the latch processing.

During the latch processing, correction unit 20A latches (acquires) the counter value of counter OC1 and latches (receives) the counter value of counter DC2 transmitted over data bus 111. The counter values thus latched are stored in storage unit 20C as latched counter values LOC1 and LDC2.

During the correction processing, correction unit 20A calculates a difference in synchronization mismatch between latched counter values LOC1 and LDC2 in storage unit 20C, determines adjustment value D (positive value or negative value) that makes the difference smaller, and adds adjustment value D thus determined to latched counter value LDC2. Correction unit 20A transfers the latched counter value obtained as a result of the addition to CPU unit 100 over data bus 111. CPU unit 100 sets counter DC2 at the latched counter value thus received, the latched counter value being obtained as a result of the addition. This corrects the counter value of counter DC2 of CPU unit 100 to remove the synchronization mismatch.

Also in FIG. 10B, correction unit 20B may perform the correction processing on the counter value of counter DC2 of CPU unit 100 using storage unit 20C. In this case, synchronization processing unit 100B periodically transmits the counter value of counter DC2 to data bus 111. Upon receipt of time synchronization signal 130 from signal line 113, correction unit 20B performs the latch processing.

During the latch processing, correction unit 20B latches (acquires) the counter value of counter DC1 and latches (receives) the counter value of counter DC2 transmitted over data bus 111. The counter values thus latched are stored in storage unit 20C as latched counter values LDC1 and LDC2.

During the correction processing, correction unit 20B determines adjustment value D that makes the difference in synchronization mismatch between latched counter values LDC1 and LDC2 and adds adjustment value D thus determined to latched counter value LDC2. Correction unit 20B transfers the value obtained as a result of the addition to CPU unit 100 over data bus 111. CPU unit 100 sets counter DC2 at latched counter value LDC2 thus received, the latched counter value LDC2 being obtained as a result of the addition. This corrects the counter value of counter DC2 of CPU unit 100 to remove the synchronization mismatch.

As described above, in control device 2, a first timer value (the counter value of counter OC1) indicated by a timer of a first unit (function unit 200) or a second timer value (the timer value of counter DC2) indicated by a timer of a second unit (CPU unit 100) upon receipt of time synchronization signal 130 over signal line 113 is acquired over a data line (data bus 111), and a synchronization mismatch between the timer of the first unit and the timer of the second unit is corrected based on the timer value thus acquired. This allows the timer (counter DC2) of the second unit (CPU unit 100) to match with the timer (counter OC1) of the first unit (function unit 200).

Referring to FIGS. 10A and 10B, control system 1 may further include a unit 370 different from CPU unit 100 and function unit 200, and cause unit 370 to perform the above-described correction processing.

Unit 370 may be connected to signal line 113 and data bus 111. Unit 370 includes a hardware processor, and the hardware processor executes a program to implement a correction unit 371 corresponding to correction unit 20A (or correction unit 20B) or correction unit 10B. When unit 370 detects time synchronization signal 130 on signal line 113, correction unit 371 reads the counter values from counter OC1 and counter DC2 (or counter DC1 and counter DC2) over data bus 111. Correction unit 371 corrects the counter value of counter DC2 so as to make the synchronization mismatch smaller using the counter value thus read as described above. The counter value thus corrected is set to counter DC2 over data bus 111.

Correction units 20A, 20B, correction unit 10B, and correction unit 371 illustrated in FIGS. 10A and 10B are examples of an adjustment module. Control device 2 or control system 1 may perform some or all of the processing provided by correction units 20A, 20B, correction unit 10B, and correction unit 371 using a dedicated hardware circuit (for example, an ASIC or an FPGA).

As described above, each control device 2 uses the time of master clock 191A (or 191B) to achieve (i) time synchronization between units, (ii) time synchronization between each unit and a device connected to the unit, and (iii) time synchronization for execution of control program 152, input program 172, and output program 174 by scheduler program 170 in CPU unit 100. Furthermore, each control device 2 performs time synchronization using common master clock 191A, 191B to achieve (iv) time synchronization between different control devices 2, that is, between different processes.

FIGS. 10A and 10B illustrate the configurations where control system 1 includes correction units 20A, 20B, correction unit 10B, and correction unit 371, but control system 1 may include at least one of the correction units.

E. Processing Flow

Figure 11:
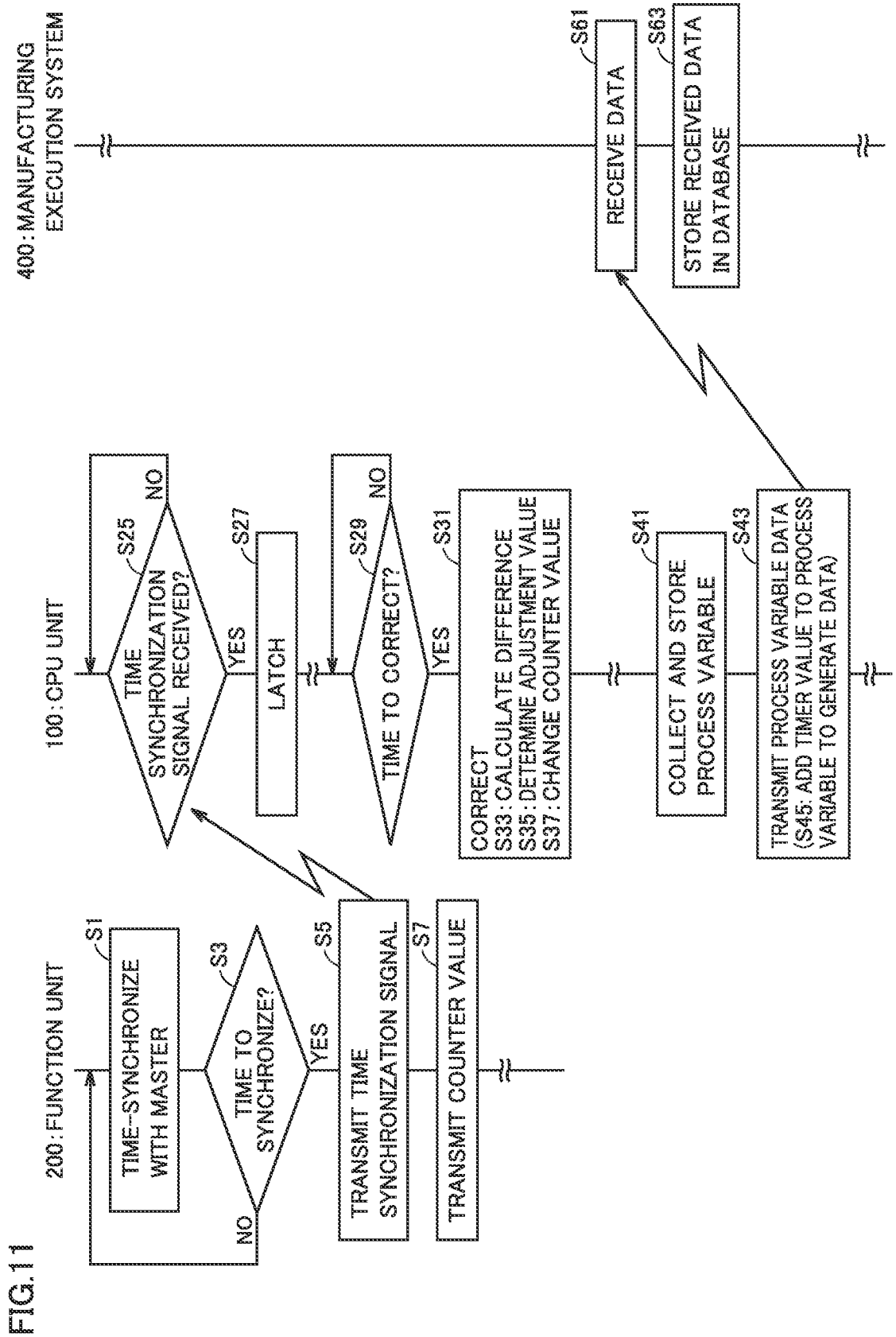
FIG. 11 is a diagram illustrating an example of a flowchart of processing according to the present embodiment.

FIG. 11 is a diagram illustrating an example of a flowchart of processing according to the present embodiment. FIG. 11 includes synchronization processing and processing of collecting a process variable. Referring to FIG. 11, processor 202 of function unit 200 causes synchronization processing unit 200A (or 200B) to perform corresponding processing.

First, processor 202 acquires the time from master clock 191A (or 191B) and sets counter OC1 (or DC1) at the timer value (step S1).

Processor 202 determines whether it is time to transmit time synchronization signal 130 (step S3). When determining that it is not time to transmit time synchronization signal 130 (NO in step S3), processor 202 returns to step S1, but when determining that it is time to transmit time synchronization signal 130 (YES in step S3), processor 202 causes signal generator 26 to generate time synchronization signal 130 and output time synchronization signal 130 to signal line 113 (step S5).

Further, processor 202 periodically transmits the counter value of counter OC1 (or DC1) to data bus 111 (step S7).

This transmission of the counter value is performed regardless of the transmission of time synchronization signal 130.

Further, in CPU unit 100, processor 1012 causes synchronization processing unit 100A (or 100B) to perform corresponding processing. Note that, during the processing illustrated in FIG. 11, processing of setting counter OC2 and updating the counter value of counter DC2 is performed.

Processor 1012 determines whether time synchronization signal 130 has been received from signal line 113 (step S25). While time synchronization signal 130 has not been received (NO in step S25), step S25 is repeated.

When determining that time synchronization signal 130 has been received (YES in step S25), processor 102 performs the above-described latching processing of latching the counter value (step S27). Processor 102 determines whether it is time to cause correction unit 10B to perform the correction processing (step S29). For example, a determination is made as to whether a predetermined time has elapsed since the reception of time synchronization signal 130. While it is determined that it is not time to perform correction (NO in step S29), step S29 is repeated.

When determining that it is time to perform the correction processing, for example, that the predetermined time has elapsed since the reception of time synchronization signal 130 (YES in step S29), processor 102 causes correction unit 10B to perform the above-described correction processing (step S31).

The correction processing includes calculating a difference between the latched counter values (step S33), determining adjustment value D for use in correction (step S35), and changing the counter value of counter DC2 using adjustment value D (step S37).

Further, in CPU unit 100, processor 102 collects process variables and stores the process variables in time-series database 180 (step S41). Processor 102 reads time-series data 182 of time-series database 180 and transmits the time-series data thus read to manufacturing execution system 400 or the IoT service providing device on the cloud (step S43). At this time, a transmission frame for time-series data 182 is created and transmitted in a frame format (step S45).

For example, manufacturing execution system 400 receives the frame of time-series data 182 from control device 2 (step S61), and stores the frame in time-series DB 450 (step S63).

Note that, in FIG. 11, CPU unit 100 performs the correction for the time synchronization processing, but as described above, function unit 200 may perform the correction for the time synchronization processing in the same manner as in step S31.

In FIGS. 10A, 10B, and 11, function unit 200 provides the counter value of counter OC1 (or counter DC1) to CPU unit 100 by periodically transmitting the counter value to data bus 111, but how to provide the counter value to CPU unit 100 is not limited to such a method. For example, when time synchronization signal 130 is transmitted to signal line 113, CPU unit 100 may refer to (read) the counter value of counter OC1 (or counter DC1) of function unit 200 over data bus 111.

F. Processing on Time-Series Data

Figure 12:
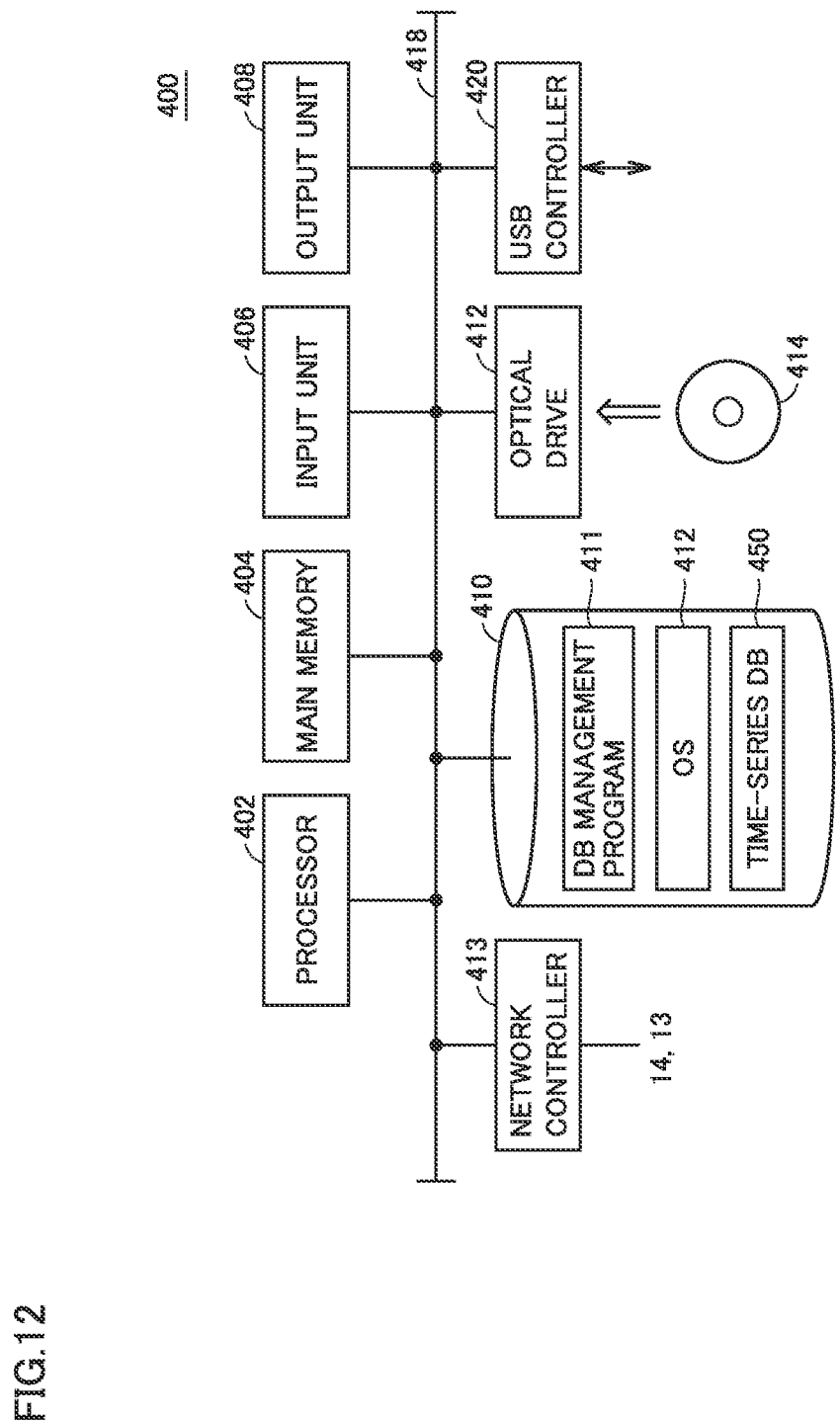
FIG. 12 is a diagram illustrating an example of a configuration of a manufacturing execution system 400 according to the present embodiment.

FIG. 12 is a diagram illustrating an example of a configuration of manufacturing execution system 400 according to the present embodiment. As an example, manufacturing execution system 400 is implemented by hardware (for example, a general-purpose personal computer) adhering to a standard architecture.

Referring to FIG. 12, manufacturing execution system 400 includes a processor 402, a main memory 404, an input unit 406, an output unit 408, a storage 410, an optical drive 412, a USB controller 420 for establishing communications with an external device, and a network controller 413 that connects networks 13, 14. Such components are connected over a processor bus 418.

Processor 402 includes a CPU, a GPU, or the like, and reads a program stored in storage 410, deploys the program into main memory 404, and executes the program to perform various processing as described later.

Main memory 404 includes a volatile storage device such as a DRAM or an SRAM. Storage 410 includes, for example, a non-volatile storage device such as an HDD or an SSD.

Storage 410 stores various programs for providing functions corresponding to manufacturing execution system 400 in addition to an OS 412 for implementing a basic function. The various programs include a DB management program 411. Further, storage 410 has an area where time-series DB 450 is stored.

Input unit 406 includes a keyboard, a mouse, and the like, and receives a user operation on manufacturing execution system 400. Output unit 408 includes a display, various indicators, a printer, and the like, and outputs a processing result and the like received from processor 402.

Manufacturing execution system 400 includes optical drive 412 so as to allow a computer-readable program stored in a non-transitory recording medium 414 (for example, an optical recording medium such as a digital versatile disc (DVD)) to be read from the recording medium and installed in storage 410 or the like.

FIG. 12 illustrates a configuration example where processor 402 executes a program to provide functions necessary for manufacturing execution system 400, but some or all of the functions thus provided may be implemented by a dedicated hardware circuit (for example, an ASIC or an FPGA).

Figure 13:
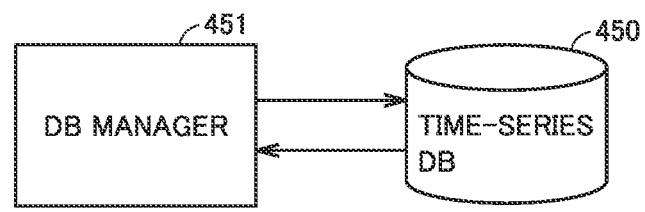
FIG. 13 is a diagram illustrating a DB manager provided through execution of a DB management program 411 illustrated in FIG. 12.

FIG. 13 is a diagram illustrating a DB manager provided through execution of DB management program 411 illustrated in FIG. 12. Referring to FIG. 13, DB manager 451 provided through the execution of DB management program 411 by processor 402 manages time-series DB 450 (for example, generation, integration, edit, analysis, or output of DB).

F1. Time Synchronization for Process Variable

Figure 14A:
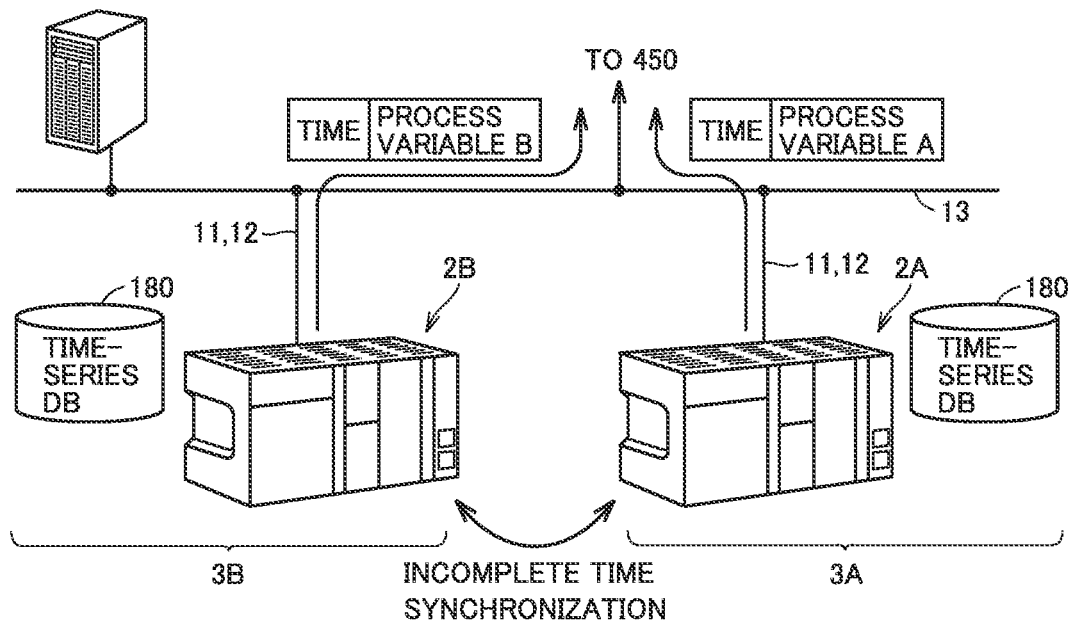
FIG. 14A is a diagram schematically illustrating an example of processing in a case where control device 2 according to the present embodiment transmits time-series data to manufacturing execution system 400.
Figure 14B:
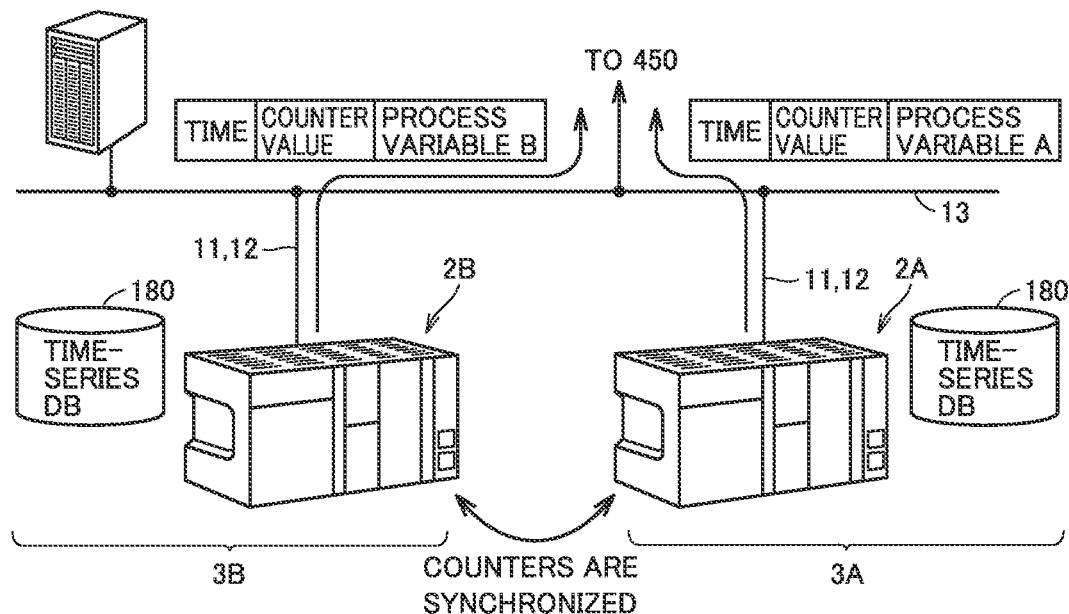
FIG. 14B is a diagram schematically illustrating an example of the processing in the case where control device 2 according to the present embodiment transmits time-series data to manufacturing execution system 400.

FIGS. 14A and 14B are diagrams schematically illustrating examples of the processing in a case where control device 2 according to the present embodiment transmits time-series data to manufacturing execution system 400. FIGS. 14A and 14B illustrate a case where the time synchronization processing is not performed (see FIG. 14A) and a case where the time synchronization processing is performed (see FIG. 14B) for the sake of comparison. FIG. 15 is a diagram schematically illustrating frames of time-series data created by control device 2 according to the present embodiment and compiled data. (A) of FIG. 15 illustrates frames each storing a process variable collected by control device 2B in a process 3B, (B) of FIG. 15 illustrates frames each storing a process variable collected by control device 2A in a process 3A, and (C) of FIG. 15 illustrates an example of time-series DB 450 that stores the process variables compiled by DB manager 451.

FIG. 14A illustrates a configuration where control devices 2A, 2B are connected to manufacturing execution system 400 over upper-level network 13. In the configuration illustrated in FIG. 14A, control device 2A and control device 2B are not time-synchronized with each other.

Each pieces of time-series data contains process variables collected by control devices 2A, 2B and a time associated with each process variable. Paradoxically speaking, in the configuration illustrated in FIG. 14A, control devices 2A, 2B can only add a time as information indicating the collection timing of each process variable. Control devices 2A, 2B individually manage times, thereby making time synchronization incomplete.

As a result, since the times are not exactly synchronized with each other among the pieces of time-series data collected by manufacturing execution system 400, DB manager 451 cannot compile (that is, integrate) the pieces of time-series data with their respective timings exactly matched with each other.

On the other hand, in the configuration illustrated in FIG. 14B, control device 2A and control device 2B include the time-synchronized counters described above. This allows the frame of time-series data transmitted from each of control device 2A and control device 2B to contain a time 452 (for example, the time acquired from the master clock) indicating the timing at which each process variable is collected in processes 3A, 3B and a counter value 453 (for example, the counter value of counter DC2) with time 452 and counter value 453 associated with the process variable (see (A) of FIG. 15 and (B) of FIG. 15).

DB manager 451 uses counter values 453 contained in the time-series data received from each of control devices 2A, 2B to allow the timings of the process variables contained in the time-series data to match with each other. That is, even when process variables are collected by different control devices 2 (in different processes), the process variables are compiled and stored in time-series DB 450 with their respective time-bases almost exactly matched with each other (see (C) of FIG. 15), and the data obtained as a result of compilation can be used for analysis of the process variables.

G. APPENDIX

The present embodiment as described above includes the following technical ideas.
[Configuration 1]
A control system (1) for factory automation includes a first unit (200) and a second unit (100) each including a timer, a data line (111) over which data containing a timer value indicated by the timer is exchanged between the first unit and the second unit, a signal line (113) configured to electrically connect the first unit and the second unit, and an adjustment module (10B, 20A, 20B) connected to the signal line and the data line, in which the adjustment module acquires, upon receipt of a trigger signal (130) over the signal line, the timer value over the data line and matches the timer (DC2) of the second unit with the timer (OC1) of the first unit based on the timer value acquired.
[Configuration 2]
In the control system according to configuration 1, one of the first unit and the second unit transmits the trigger signal to the signal line.

[Configuration 3]
The control system according to configuration 1 or 2 further includes a unit (190) configured to transmit the trigger signal to the signal line, the unit being different from the first unit and the second unit.
[Configuration 4]
In the control system according to any one of configurations 1 to 3, the adjustment module is provided in one of the first unit and the second unit.
[Configuration 5]
The control system according to any one of configurations 1 to 4 further includes a unit including the adjustment module, the unit being different from the first unit and the second unit.
[Configuration 6]
In the control system according to any one of configurations 1 to 5, the adjustment module acquires, upon receipt of the trigger signal over the signal line, a difference between the timer value of the timer of the first unit and the timer value of the timer of the second unit using the timer value acquired over the data line, and adjusts the timer value of the timer of the second unit using an adjustment value based on the difference acquired to match the timer of the second unit with the timer of the first unit.
[Configuration 7]
In the control system according to configuration 6, the adjustment module determines the adjustment value from variations in magnitude of the difference detected for each reception of the trigger signal.
[Configuration 8]
The control system according to configuration 7 further includes a plurality of control devices (2) connected to a first network (11), each of the plurality of control devices includes the first unit and the second unit, and the plurality of control devices are synchronized with each other using a common time (191A, 191B) received over the first network and used for synchronization between the timers.
[Configuration 9]
The control system according to configuration 8 further includes one or more machines (90) connected to each of the plurality of control devices over a second network (110) lower in level than the first network, and synchronous timers (101A, 101B, 101C) synchronized with each other among the plurality of control devices, and the control device and the one or more machines connected to the control device over the second network are synchronized with each other using timer values of the synchronous timers.

It should be understood that the embodiments disclosed herein are illustrative in all respects and not restrictive. The scope of the present invention is defined by the claims rather than the above description and is intended to include the claims, equivalents of the claims, and all modifications within the scope.

REFERENCE SIGNS LIST

1: control system, 2, 2A, 2B, 2C: control device, 3A, 3B, 3C: process, 10B, 20A, 20B: correction unit, 10C, 21: storage area, 11, 12, 13, 14, 110: network, 23, 177: time synchronization program, 24: security program, 90, 90A, 90C, 90D, 90F, 90G, 90I: field machine, 91A, 91C, 91D, 91F, 91G, 91I, 101A, 101B, 101C, 102A, 102B, 102C, 401A, 401C: timer, 100: CPU unit, 100A, 100B, 200A, 200B: synchronization processing unit, 101, 102, 202, 402: processor, 110P: signal port, 111, 112: data bus, 113: signal line, 119, 121, 123, 125, 126, 168, 213, DC, DC1, DC2, OC, OC1, OC2: counter, 191, 191A, 191B: master clock, 130:

time synchronization signal, 178: correction program, 180: time-series database, 182: time-series data, 190: device/line management device, 400: manufacturing execution system, 450: time-series DB, 451: DB manager, 500: support device, LDC1, LDC2, LOC1: latched counter value

The invention claimed is:

1. A control system for factory automation, the control system comprising:
 a first unit and a second unit each including a timer;
 a data line over which data containing a timer value indicated by the timer is exchanged between the first unit and the second unit;
 a signal line configured to electrically connect the first unit and the second unit; and
 an adjustment module connected to the signal line and the data line,
 wherein the first unit includes a signal port configured to connect to the signal line, and the second unit includes a signal port configured to connect to the signal line,
 wherein the first unit includes a data communication circuit configured to connect to the data line, and the second unit includes a local bus controller configured to connect to the data line,
 wherein the adjustment module acquires, when receiving a trigger signal over the signal line, the timer value over the data line and matches the timer of the second unit with the timer of the first unit based on the timer value acquired, and
 wherein the adjustment module matches the timer of the second unit with the timer of the first unit by dividing an adjustment value into a plurality of adjustment values, and adding each of the plurality of adjustment values to the timer value periodically and cumulatively.

2. The control system according to claim 1, wherein one of the first unit and the second unit transmits the trigger signal to the signal line.

3. The control system according to claim 1, further comprising a unit configured to transmit the trigger signal to the signal line, the unit being different from the first unit and the second unit.

4. The control system according to claim 1, wherein the adjustment module is provided in one of the first unit and the second unit.

5. The control system according to claim 1, further comprising a unit including the adjustment module, the unit being different from the first unit and the second unit.

6. The control system according to claim 1, wherein the adjustment module acquires, when receiving the trigger signal over the signal line, a difference between the timer value of the timer of the first unit and the timer value of the timer of the second unit using the timer value acquired over the data line, and
 wherein the adjustment value is based on the difference.

7. The control system according to claim 6, wherein the adjustment module determines the adjustment value from a tendency of variation in magnitude of the difference acquired for each reception of the trigger signal.

8. The control system according to claim 7, further comprising a plurality of control devices connected to a first network,
 wherein each of the plurality of control devices includes the first unit and the second unit, and
 the plurality of control devices are synchronized with each other using a common time received over the first network and used for synchronization between the timer of the first unit and the timer of the second unit.

9. The control system according to claim 8, further comprising:
 one or more machines connected to each of the plurality of control devices over a second network lower in level than the first network; and
 synchronous timers synchronized with each other among the plurality of control devices,
 wherein each of the plurality of control devices and the one or more machines connected to the control device over the second network are synchronized with each other using timer values of the synchronous timers.

10. The control system according to claim 1, wherein the first unit includes a network interface configured to connect to a first network including the Internet, wherein the second unit includes a communication controller configured to connect to the data line, and the second unit is configured to connect to the first network through the communication controller, the first unit, and the a network interface,
 wherein the first unit monitors access to the second unit from the first network.

* * * * *